United States Patent
Gupta

(10) Patent No.: US 10,558,502 B2
(45) Date of Patent: Feb. 11, 2020

(54) SOFTWARE APPLICATION RUNTIME HAVING DYNAMIC EVALUATION FUNCTIONS AND PARAMETERS

(71) Applicant: SAP SE, Walldorf (DE)

(72) Inventor: Vipul Gupta, Bangalore (IN)

(73) Assignee: SAP SE, Walldorf (DE)

( * ) Notice: Subject to any disclaimer, the term of this patent is extended or adjusted under 35 U.S.C. 154(b) by 219 days.

(21) Appl. No.: 15/673,152

(22) Filed: Aug. 9, 2017

(65) Prior Publication Data
US 2019/0050266 A1   Feb. 14, 2019

(51) Int. Cl.
G06F 9/46    (2006.01)
G06F 9/50    (2006.01)
G06F 11/34   (2006.01)

(52) U.S. Cl.
CPC ........ *G06F 9/5055* (2013.01); *G06F 11/3404* (2013.01); *G06F 11/3466* (2013.01); *G06F 11/3447* (2013.01)

(58) Field of Classification Search
None
See application file for complete search history.

(56) References Cited

U.S. PATENT DOCUMENTS

| | | | | |
|---|---|---|---|---|
| 6,574,734 B1 * | 6/2003 | Colson | ............... | G06F 9/445 |
| | | | | 701/1 |
| 2002/0019853 A1 * | 2/2002 | Vange | ............... | G06F 9/5027 |
| | | | | 709/207 |
| 2011/0138050 A1 * | 6/2011 | Dawson | ............... | G06F 9/5072 |
| | | | | 709/226 |
| 2012/0173729 A1 * | 7/2012 | Lee | ............... | G06F 9/5044 |
| | | | | 709/226 |
| 2017/0262645 A1 | 9/2017 | Gupta et al. | | |

OTHER PUBLICATIONS

"Prioritizing the Processing of Messages," retrieved from https://help.sap.com/SAPhelp_nw73/helpdata/en/48/b2e00f6b156ff4e10000000a42189b/frameset.htm, on or before Aug. 2017, 2 pages.

(Continued)

*Primary Examiner* — Kenneth Tang
(74) *Attorney, Agent, or Firm* — Klarquist Sparkman, LLP

(57) ABSTRACT

The present disclosure generally relates to a software application runtime having dynamic evaluation functions and parameters. A dynamic evaluation engine of an application's runtime accepts evaluation requests from methods of a software application. A request can be associated with an identifier for a method of the software application. The method identifier can be associated with one or more dynamic evaluation functions having one or more dynamic evaluation parameters. When the dynamic evaluation engine receives a request from an application method, the dynamic evaluation engine can determine the one or more current dynamic evaluation functions or parameters to use with the request. The dynamic evaluation engine can return an evaluation result to the method. The dynamic evaluation engine can be in communication with a repository, such as a central repository, providing a unique mechanism to look up dynamic evaluation functions and parameters, which can be imported into the application's runtime.

20 Claims, 26 Drawing Sheets

(56) References Cited

OTHER PUBLICATIONS

"Integrating SAP® Ariba® Cloud Solutions with SAP ERP and SAP S/4HANA®," retrieved from https://www.ariba.com/resources/library/library-pages/integrating-sap-ariba-cloud-solutions-with-sap-erp-and-sap-s-4hana#, on or before Aug. 2017, 19 pages.

"Procurement Solutions Integration Guide for SAP," retrieved from https://connect.ariba.com/connect/Downloads/HAA/docs/procurement/en/training/ext_procure/sap_integration/pdf/sap_integration.pdf, on or before Aug. 2017, 191 pages.

\* cited by examiner

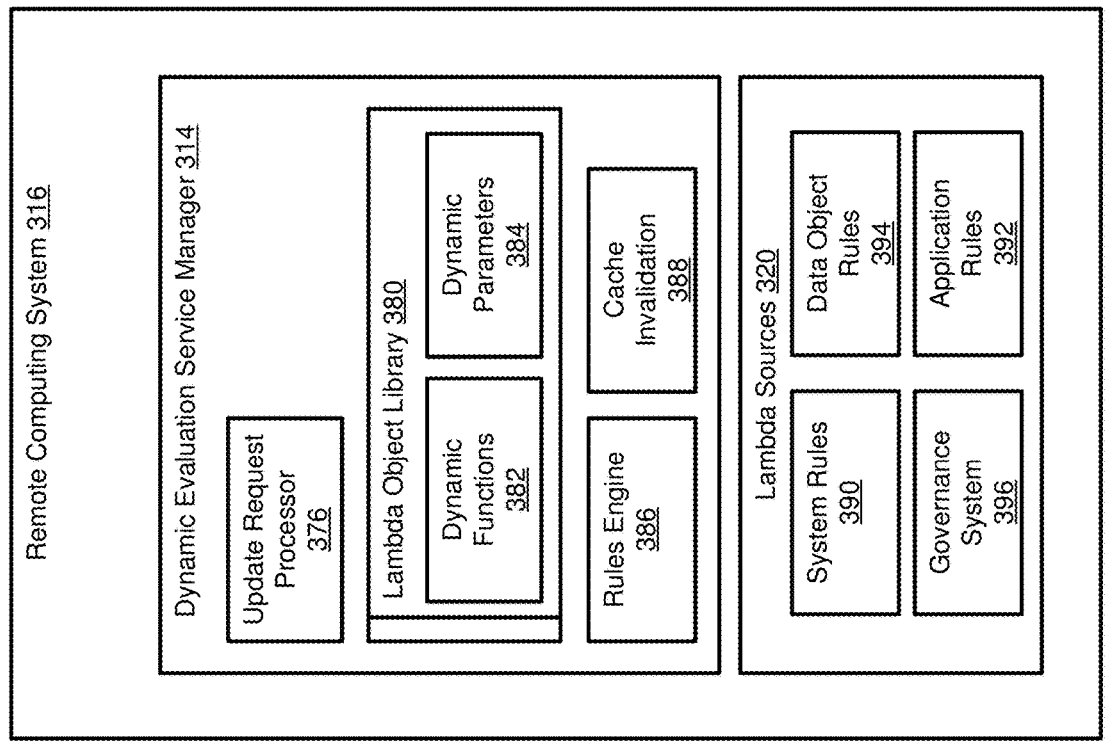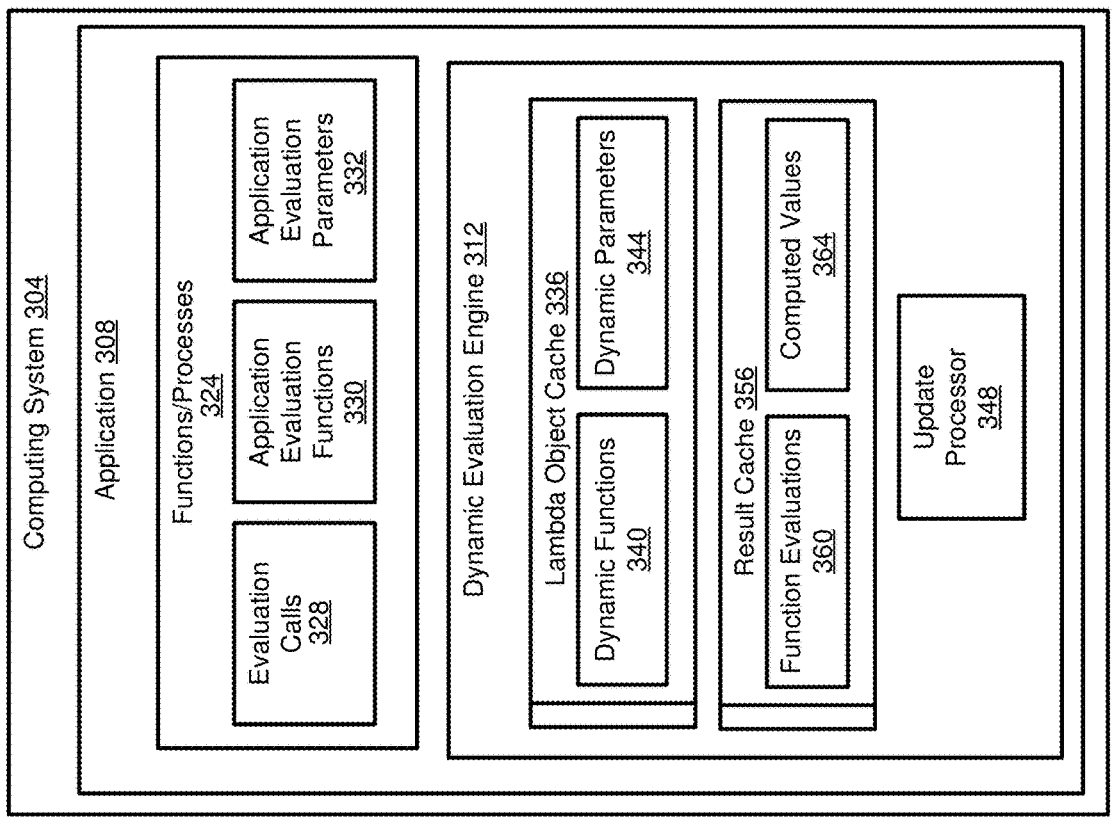
FIG. 3

```
public void sendMessage(MessagePacket businessMessagePacket)
{
    Open Packet
    Preprocess the details in the packet
    Compute the message from the message header and message payload
    Message priority = Call PFunction to compute message sending priority (application id, function id)
    Send message using the configured transport protocol
}
```

FIG. 5A

```
public void executeHistoricalEncryptionRun(BuisnessTable tableReference)
{
    .... Configure environment
    SleepTime timeToSleep= Call PFunction to compute wait time (application id, function id)
    Thread.sleep(timeToSleep)
    execute encryption run (...)
}
```

FIG. 5B

```
@PrioritizationProxy(proxyHome="{proxyPath}", serviceHome="{serviceUrl}")
@EnableServiceCalls
@Secured("com.ariba.pfunctions")
public class PrioritizationProxy
{
  @AutoWired
  private PrioritizationService prioritizationService;

/**
   * This method is used to register a new application function, Pfunction, with the Prioritization
   * system. Once registered, the corresponding lambda parameters and lambda
   * functions are registered against the unique registered function.
   *
   * @param uniqueName
   * @param application
   * @param secretCode
   */
  public void registerPFunction (final String uniqueName,
                  final String application,
                  final SecretCode secretCode)
  {
    prioritizationService.register(uniqueName, application, secretCode);
  } public List<LambdaParameters> getLambdaParameters (final String uniqueName,
                  final String application,
                  final SecretCode secretCode)
  {
    return prioritizationService.getLambdaParameters(
      new PFunctionIdentifier(uniqueName, application),
      secretCode);
  } public List<LambdaFunctions> getLambdaFunctions (final String uniqueName,
                  final String application,
                  final SecretCode secretCode)
  {
    return prioritizationService.getLambdaFunctions(
      new PFunctionIdentifier(uniqueName, application),
      secretCode);
  }
}
```

FIG. 6

```
@EnableWebSecurity
@EnableServiceCalls
@Secured("com.ariba.pfunctions")
public class PrioritizationService implements PService
{
   private static final Logger Logger = LoggerFactory.getLogger(PrioritizationService.class);

@Autowired
   private ApplicationPropertiesLoader applicationPropertiesLoader;

@Autowired
   private PriorityTemplate pTemplate;

@Autowired
   private ValidationService validator;

@AutoWired
   private EncryptionService encryptionService;

@AutoWired
   private AuthenticationService authenticationService;

/**
    * {@inheritDoc}
    */
   public void register (String uniqueName, String application, SecretCode secretCode)
      throws PriorityServiceException, SecurityException, IllegalArgumentException
   {
      Assert.NotNull(uniqueName);
      Assert.NotNull(application);
      Assert.NotNull(secretCode);
```

FIG. 7A

```
validator.validateSecretCode(secretCode);
authenticationService.validateCallerAndSubnet(secretCode);

Logger.info(
    Messages.getMessage(
        "PFunction.Service.LambdaParametersRegistrationMsg",
        new Object[] { uniqueName, application, encryptionService.encrypt(secretCode) }));

synchronized (this) {
    boolean isPfunctionUnique = pTemplate.checkUniqueness(uniqueName, application);
    if (!isPfunctionUnique) {
        throw new PriorityServiceException(
            Messages.getMessage("PFunction.Service.NotUniquePFunction"));
    }
    pTemplate.register(uniqueName, application, secretCode);
    }
}

/**
 * {@inheritDoc}
 */
public List<LambdaParameters> getLambdaParameters (PFunctionIdentifier pFunctionIdentifier,
                    SecretCode secretCode)
    throws SecurityException, IllegalArgumentException, PriorityServiceException
{
    Assert.NotNull(pFunctionIdentifier);
    Assert.NotNull(secretCode);

validator.validatePFunctionIdentifier(pFunctionIdentifier);
    validator.validateSecretCode(secretCode);

authenticationService.validateCallerAndSubnet(secretCode);

Logger.info(
        Messages.getMessage(
            "PFunction.Service.LambdaParametersInvocationMsg",
            new Object[] { pFunctionIdentifier, encryptionService.encrypt(secretCode) }));
    UniqueParametersCode code = pTemplate.load(pFunctionIdentifier);
    return pTemplate.queryForLambdaParameters(code);
}

/**
 * {@inheritDoc}
 */
public List<LambdaFunctions> getLambdaFunctions (PFunctionIdentifier pFunctionIdentifier,
                    SecretCode secretCode)
    throws SecurityException, IllegalArgumentException, PriorityServiceException
{
    Assert.NotNull(pFunctionIdentifier);
```

FIG. 7B

```
    Assert.NotNull(secretCode);

validator.validatePFunctionIdentifier(pFunctionIdentifier);
    validator.validateSecretCode(secretCode);

authenticationService.validateCallerAndSubnet(secretCode);

Logger.info(
       Messages.getMessage(
          "PFunction.Service.LambdaFunctionsInvocationMsg",
          new Object[] { pFunctionIdentifier, encryptionService.encrypt(secretCode) }));
    UniqueFunctionCode code = pTemplate.load(pFunctionIdentifier);
    return pTemplate.queryForLambdaFucntions(code);
 }

@PostConstruct
 public void run (String... strings) throws Exception
 {
    applicationPropertiesLoader.loadPropertiesToSystem();
    setTrustedSubnets(System.getProperty(PFunctions.TrustedRemoteSubnets));
    MetadataBuilder.getInstance().buildEventCache(PFunctions.EventsFilename);
 }
}
```

FIG. 7C

```
public class PacketCreator implements Serializable
{
  /**
   * The method used to create packet.
   *
   * @param applicationName name of the application class whose packet is being created.
   * @param obj reference to the object which is to be converted into a
   *        packet.
   * @return A properly create packet ready to be transferred or null incase
   *        of any failure.
   */
  public static synchronized Packet createPacket (String applicationName,
                                  ILambda obj)
  {
    Logger.debug(
              "Creating Lambda Packet for : Application: " + applicationName);
    Packet packet = null;

try {
          int fileLength = (int) (new File(lambdaName + ".class").length());
       ByteArrayOutputStream bos = new ByteArrayOutputStream();

ObjectOutputStream out = new ObjectOutputStream(bos);
       out.writeObject(obj);
       out.close();

int serialObjectLength = bos.size();
       byte[] b = bos.toByteArray();

packet = new Packet(hostname, port, lambdaName, fileLength, serialObjectLength, 2);

packet.createPacket(
           new FileInputStream(lambdaName + ".class"),
           new ByteArrayInputStream(b));
    } catch (Exception e) {
       // Exception handling code
    }
    return packet;
  }
}
```

FIG. 8

```
/** The basic lambda interface. Every lambda object is a descendent of
 * ILambda i.e. every lambda is of type ILambda.
 * <BR>
 * These methods represent common functionality that lambda typically support.
 *
 */
public interface ILambda extends Runnable,Serializable
{
        /**
         * For Normal Transfer
         */
        public final int TRANSFER = 1;

/**
         * For Secure Transfer
         */
        public final int STRANSFER = 2;

/**
         * To kill/destroy
         */
        public final int KILL = 3;

/**
         * To signal the lambda-base to do something with this lambda.
         * @param signalNumber signifies what to do.
         */
        public void signal(int signalNumber);

public void signalWithParameters(int signalNumber, ConnectionParameters conn);
        /**
         * This method can be used for initializing a lambda object.
         *This is typically the first lambda method which will be called.
         *
         */
        public void initialization();
        /**
         *      Called when an instance of the lambda is created.
         *      It is the responsibility of the lambda base creator to
         *      ensure that this happens. This should typically be called
         *      from the constructor of the lambda classes.
         *
         */
        public void onCreation();
        /**
         *
         * Used to set the name of a specific lambda.
         *
         */
```

FIG. 9A

```
public void setMyName(String name);

/**
 *
 * Used to get the name of the lambda
 *
 * @return the name of the lambda.
 */
public String getMyName();

/**
 * To set the lambda base which starts this lambda.
 * @param base the reference to the lambda base.
 */
public void setLambdaBase(ILambdaBase base);

```
/* Base interface for mobile lambdas. */ public interface IMobileLambda extends ILambda,Serializable
{
    /**
     * To set the home address of a specific lambda.
     * Home address means the address where the lambda was first started.
     *
     * @param address address to set
     */
    public void setMyHomeAddress(String address);

/**
     * To get the home address of a specific lambda.
     * Home address means the address where the lambda was first started.
     * @return the home address of an lambda.
     */
    public String getMyHomeAddress();

/**
     * Called on arrival of an lambda at a new lambda base.
     *
     */
    public void onArrival();

/**
     * Called before departure of an lambda from a lambda base.
     *
     */
    public void beforeDeparture();

/**
     * Method to signal return to home.
     *
     */
    public void returnHome();

```
/* Base interface for service lambdas.*/ public interface IServiceLambda extends ILambda
{
        /**
         * To handle incoming internal requests.
         *
         * @param s The request to handle/process.
         * @return an Object containing the result of the request.
         *
         * <br>
         * <b>**The library can also support
         * customized communication language between lambdas.
         * ** </b>
         * <br>
         *
         */
        public Object handleServiceRequest(String s);

```
public class ServiceLambda implements IServiceLambda
{
        String name;
        int value;

public ServiceLambda(){ } public ServiceLambda(String name, int val)
        {
                this.name = name;
                this.value = val;
        } public void initialization(){ }
        public void onCreation(){ }
        public void setMyName(String name) { }
        public String getMyName()
        {
                // base implementation
                return null;
        } public Object handleServiceRequest(String s)
        {
                // base implementation
                return null;
        } public void run()
        { } public void signal(int signalNumber)
        { } public void setLambdaBase(ILambdaBase base) { }

/**
         * @see lambda.ILambda#signalWithParameters(int,lambdabase_utils.ConnectionParameters)
         */
        public void signalWithParameters(int signalNumber, ConnectionParameters conn)
        { }
}
```

FIG. 12

```
/**
 *
 * Utility class for making deep copies of objects.
 * As different from clone() method of Object class for shallow copies.
 * Objects are first serialized and then deserialized.
 * If an object is encountered that cannot be serialized
 * (or that references an object that cannot be serialized)
 * an error is logged and the error is also
 * thrown back to the calling method/class.
 *
 */
public class Cloner
{
        /**
         * Returns a copy of the object, or null if the object cannot
         * be serialized.
         */
        public static Object getClone(Object object) {
          try {
                    ByteArrayOutputStream baos = new ByteArrayOutputStream();
                    ObjectOutputStream oos = new ObjectOutputStream(baos);
                    oos.writeObject(object);
                    ByteArrayInputStream bais = new ByteArrayInputStream(baos.toByteArray());
                    ObjectInputStream ois = new ObjectInputStream(bais);
                    return ois.readObject();
          }
          catch (Exception e) {
                    // Log as needed
                    return null;
          }
        }
}
```

FIG. 13

```
protected Class findClass(String className) throws ClassNotFoundException
{
        byte[] classBytes = loadFromCustomRepository(className);
        if(classBytes != null)
        {
                return defineClass(className,classBytes,0,classBytes.length,
                        new ProtectionDomain(cs,pp));
        }
        throw new ClassNotFoundException(className);
}

/**
 * Private method that loads binary class
 * file data from the classRepository.
 */
private byte[] loadFromCustomRepository(String classFileName)
        throws ClassNotFoundException
        {
        Iterator dirs = classRepository.iterator();
        byte[] classBytes = null;
        while (dirs.hasNext()) {
           String dir = (String) dirs.next();
           classFileName.replace('.',File.separatorChar);
           classFileName += ".class";
           try {
                File file = new File(dir,classFileName);
                if(file.exists () ) {
                   InputStream is = new FileInputStream(file);
                   classBytes = new byte[is.available()];
                   is.read(classBytes);
                   break;
                }
           }
           catch(IOException ex) {
                log error
                return null or throw exception as necessary;
           }
        }
        return classBytes;
    }
```

FIG. 14A

```
/**
 * Used internally to initialize the loader.
 * userClassPath is passed in as a string of directories/jar files separated
 * by the File.pathSeparator
 *
 * @param searchPath the path where to perform the search
 */
private void initLoader(String searchPath)
{
        classRepository = new ArrayList();
        if( (searchPath != null) && !(searchPath.equals("")) )
        {
                StringTokenizer tokenizer = new StringTokenizer(searchPath,File.pathSeparator);
                while(tokenizer.hasMoreTokens())
                {
                        classRepository.add(tokenizer.nextToken());
                }
        }
}
```

FIG. 14B

```
public class PFunction implements IPFunction
{
  private String uniqueName;
  private String application;

@Autowired
  private PrioritizationProxy prioritizationService;

@Autowired
  private SecretService secretService;

@Autowired
  private ExecutorService executor;

@Autowired
  private ResultCombiner combiner;

private Parameters userDefinedParameters;

private List<Function<Parameters, PResult>> userFunctions;

public PFunction(final String uniqueName,
           final String application,
           final Parameters parameters,
           final List<Function<Parameters, PResult>> functions)
  {
    register(uniqueName, application);
    initialize(parameters, functions);
  } public final PResult execute ()
  {
    Parameters userDefined = this.userDefinedParameters;
    SecretCode secretCode = secretService.generateSecretCode(this);
    List<LambdaParameters> lambdaParameters = prioritizationService.getLambdaParameters(
        uniqueName,
        application,
        secretCode);
    List<LambdaFunctions> lambdaFunctions = prioritizationService.getLambdaFunctions(
        uniqueName,
        application,
        secretCode);

ExecutionProcess currentExecutor = executor.generateNewExecutor();
    currentExecutor.computeParameters(userDefined);
    lambdaParameters.stream().forEach(x -> currentExecutor.computeParameters(x));
    userFunctions.stream().forEach(x -> currentExecutor.executeFunction(x));
    lambdaFunctions.stream().forEach(x -> currentExecutor.executeFunction(x));
    return combiner.getResult(currentExecutor);
  }
```

FIG. 15A

```
public void initialize (Parameters parameters, List<Function<Parameters, PResult>> functions)
{
   setUserFunctionParameters(parameters);
   setUserFunctions(functions);
} private void setUserFunctionParameters (Parameters parameters)
{
   this.userDefinedParameters = parameters;
} private void setUserFunctions (List<Function<Parameters, PResult>> functions)
{
   this.userFunctions = functions;
}

@Override
public void register (String name, String application)
{
   this.uniqueName = uniqueName;
   this.application = application;
}
}
```

FIG. 15B

```
public class MessagePriorityPFunction extends PFunction
{
    private static final String NAME = "CDY-MessagePriority-XU21";
    private static final String APPLICATION = "L21N-34-YIU52";

private MessagePriorityPFunction()
    {
        super(NAME, APPLICATION, getParametersForPriority(), getFunctionsForPriority());
    } private Parameters getParametersForPriority ()
    {
        Parameters parameters = ParametersFactory.getInstance()
                        .setSystemParameter(ParamaterUtil.LoadOnNode)
                        .setSystemParameter(ParamaterUtil.TimeOfDay)
                        .setSystemParameter(ParamaterUtil.DataCenterLocation)
                        .setSystemParameter(ParamaterUtil.ConcurrencyFactor)
                        .setUserParameterSD(ParamaterUtil.constructUserParameter(RealmSize))
                        .setUserParameterSD(ParamaterUtils.constructUserParameter(RealmThrottle))
                        .build();
        return parameters;
    } private List<Function<Parameters, PResult>> getFunctionsForPriority ()
    {
        List<Function<Parameters, PResult>> functionsToCompute = new ArrayList<>();
        Function<Parameters, PResult> computeSystemLoad = getSystemLoadFunction(SystemUtils.LoadParamaters());
        functionsToCompute.add(computeSystemLoad);
        functionsToCompute.add(//Other functions//);
        functionsToCompute.add(//Other functions//);
        return functionsToCompute;
    }
```

FIG. 16A

```
private Function<Parameters, PResult> getSystemLoadFunction (LoadParameters p)
{
   return input -> {
      PResult result = new PResult();
      long loadFactor = Computer.systemLoad(input.getSystemLoad());
      long memoryFactor = Computer.memoryLoad(input.memoryConsumption());

double priority = 1.0;
      if(loadFactor > 0.9){
         priority *= input.getHighLoadMultiplier;
      }
      if(memoryFactor > 0.6){
         priority *= input.getHighMemoryMultiplier;
      }
      result.addFactor(LoadParamaters.Priority, priority);
      return result;
   };
} public static PFunction newPFunction() {
   return new MessagePriorityPFunction();
}
}
```

FIG. 16B

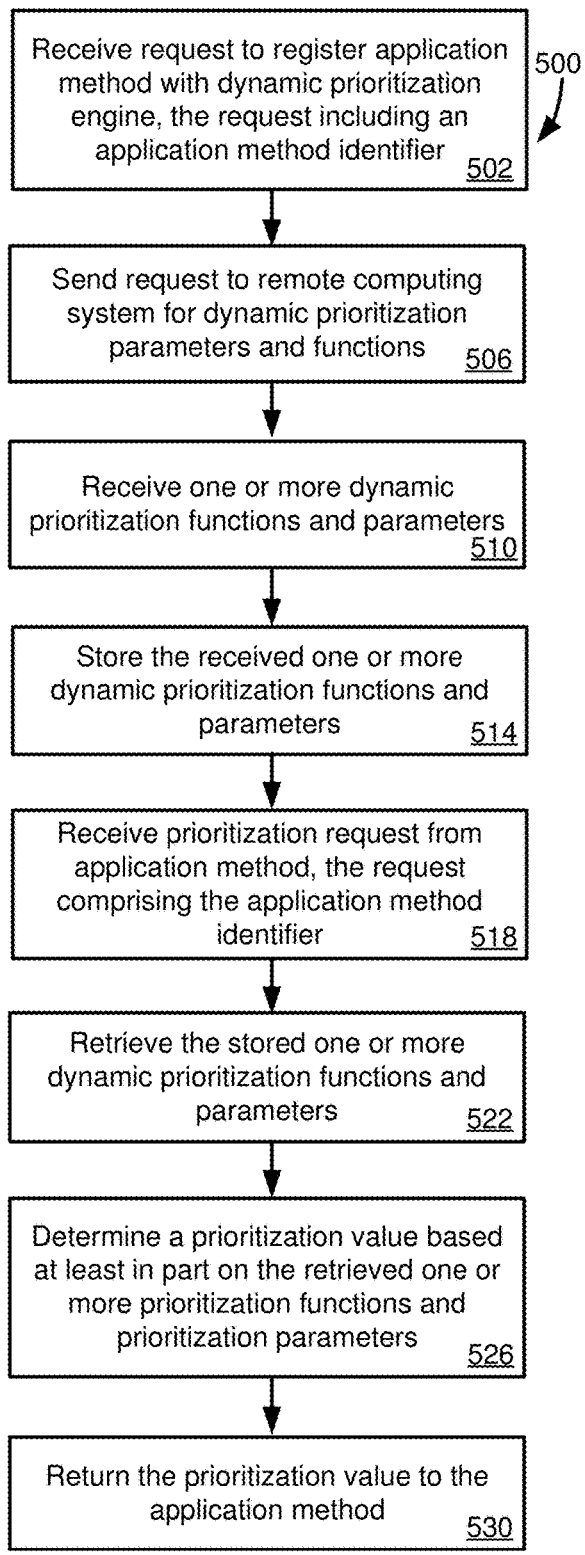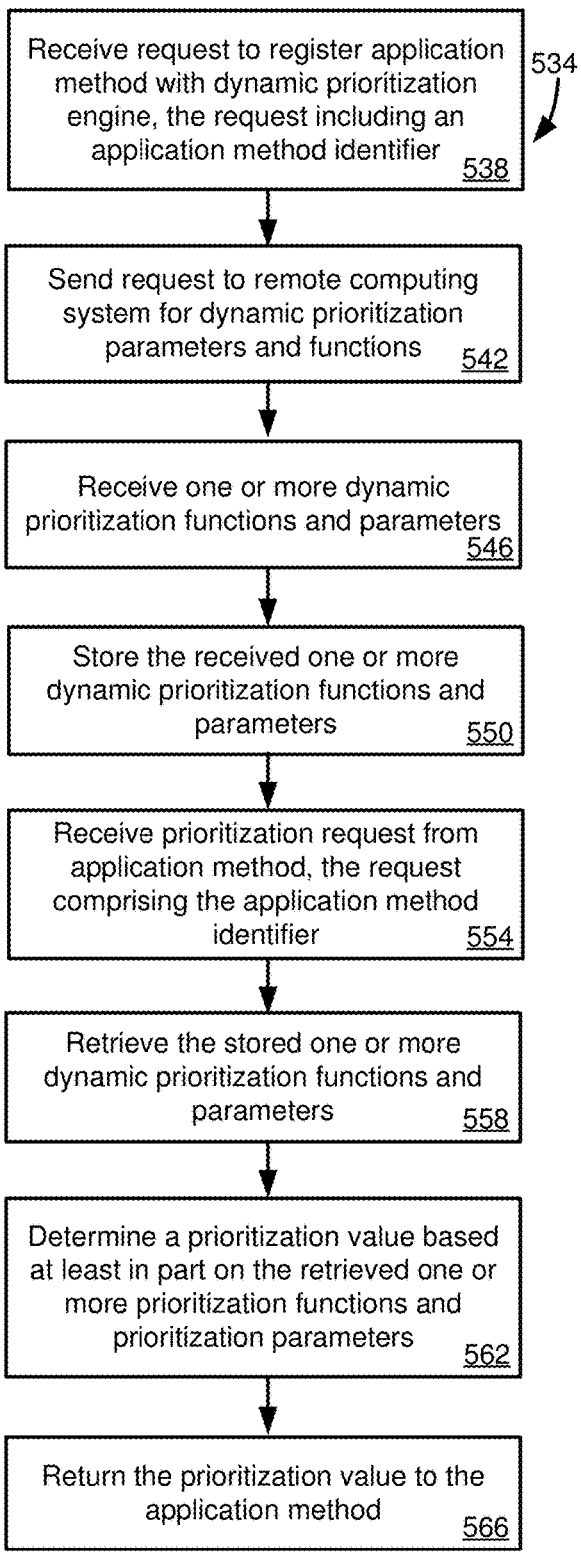
FIG. 17A
FIG. 17B

SOFTWARE APPLICATION RUNTIME HAVING DYNAMIC EVALUATION FUNCTIONS AND PARAMETERS

FIELD

The present disclosure generally relates to software applications having a runtime where functions and parameters used for evaluations associated with methods of the application can be dynamically altered. In particular implementations, the dynamic evaluation functions and dynamic evaluation parameters can be added, removed, or modified during application runtime, and such changes are abstracted relative to methods of the software application requesting one or more results of one or more computations based at least in part on the dynamic evaluation functions and the dynamic evaluation parameters.

BACKGROUND

Software programs, including applications, frameworks, and operating systems, often evaluate one or more parameters in determining when to take an action, how to take an action, and what action should be taken. For instance, a software program may manage the execution of multiple tasks. This management can include maximizing use of computing system resources (e.g., one or more processors, memory, network bandwidth, etc.), without overtaxing the computing system, and ensuring that tasks are completed in a timely way, including taking into account various priorities that may be associated with the tasks.

Typically, the parameters evaluated by a software program, and functions used to evaluate the parameters and which can return a result that can be used to guide execution of the software program, are fixed when the program is written. The parameters and functions are typically hard coded, such that that they are not updated (or updatable) unless and until a new version of the software program is available. Thus, it can be cumbersome to update software programs to change functions or parameters that are evaluated during program execution. Particularly in the case of software programs that are part of a larger collection, or which have expansive functionality, such as an application framework, an operating system, or function libraries, updates may be comparatively infrequent.

As an example, a computing system may need to schedule, swap, and prioritize different tasks, including different tasks by different users. A cloud computing system may serve a cluster of computing systems or devices, and typically needs to simultaneously manage and execute many tasks, associated with a plurality of the serviced computing systems or devices. Code can be written to determine how to schedule and prioritize tasks. Also, different nodes forming a software cluster for an application may need to behave and operate differently based on the computations performed on the specific nodes, and may need to be prioritized or scheduled (e.g., throttled) differently.

After a program is developed that includes code to carry out these prioritization and scheduling functions, the configuration of the cloud computing system may change, the serviced computing systems and devices may change, the relative priorities desired for different tasks may change, tasks may be added changed, or removed, or other changes may occur that may impact how scheduling, swapping, and prioritization should be carried out. If changes are cumbersome to implement and apply, it may reduce the number of changes that are made, and the frequency at which the changes are made, which can result in less efficient use of system resources and less efficient execution of software functions. Accordingly, room for improvement exists in how software programs evaluate various parameters, including the parameters and functions that are to be evaluated.

SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

The disclosed innovations relate generally to providing flexibility to applications in obtaining results, evaluations results, that can determine aspects of application execution. An application can use a dynamic evaluation engine to obtain evaluation results, but the details of how the results are determined are encapsulated in the dynamic evaluation engine and abstracted with respect to the calling application methods. The dynamic evaluation engine includes dynamic evaluation parameters and dynamic evaluation functions that can be used to generate dynamic results, and thus dynamic application behavior, in response to a request from an application method. Dynamic evaluation functions and dynamic evaluation parameters can be flexibly associated with a particular application method in, and during, application runtime.

An embodiment can be implemented as one or more computer-readable media comprising computer-executable instructions that, when executed, cause a computing system to perform processing to provide a prioritization value to a requesting application method. The processing can include receiving, such as by a dynamic prioritization engine, a request to register the application method. The request can include an application method identifier. A request is sent to a remote computing system (e.g., hosting a storage system) for dynamic prioritization parameters, dynamic prioritization functions, or a combination thereof, for the application method identifier. One or more dynamic prioritization parameters, dynamic prioritization functions, or a combination thereof, are received from the remote computing system to be associated with the application method identifier. The one or more dynamic prioritization parameters, dynamic prioritization functions, or combination thereof, are stored in association with the application method identifier. A prioritization request is received from the application method. The prioritization request comprises the application method identifier. The application method identifier is used to retrieve the one or more dynamic prioritization parameters, dynamic prioritization functions, or combination thereof, associated with the application method identifier. A prioritization value is determined based at least in part on the one or more dynamic prioritization parameters, dynamic prioritization function, or combination thereof, associated with the application method identifier. The prioritization value is returned to the application method in response to the request.

An embodiment can be implemented as a system comprising memory; one or more hardware processors coupled to the memory; and one or more computer-readable media storing instructions that, when loaded into the memory, cause the one or more hardware processors to perform operations in the runtime of an application for processing an evaluation request from an application method. The operations include receiving a request to register the application method with a dynamic evaluation engine of the application.

The request to register includes an application method identifier. A request is sent to a computing system for dynamic evaluation parameters, dynamic evaluation functions, or a combination thereof, for the application method identifier. One or more dynamic evaluation parameters, dynamic evaluation functions, or combination thereof, are received from the remote computing system to be associated with the application method identifier. The received one or more dynamic evaluation parameters, dynamic evaluation functions, or combination thereof, are stored in association with the application method identifier. An evaluation request is received from an application, and includes the application method identifier. Using the application method identifier, the one or more dynamic evaluation parameters, dynamic evaluation functions, or a combination thereof, associated with the application method identifier are retrieved. An evaluation result is determined based at least in part on the one or more dynamic evaluation parameters, dynamic evaluation functions, or a combination thereof, associated with the application method identifier. The evaluation result is then used by the application method to proceed with its execution using the result so computed.

An embodiment can be implemented as a method carried out at least in part by a computing system operating a dynamic evaluation service manager. A request is received for one or more dynamic evaluation functions, one or more dynamic evaluation parameters, or a combination thereof. The request is received from a dynamic evaluation engine of a client computing system and includes an application process identifier. One or more stored dynamic evaluation functions, one or more stored dynamic evaluation parameters, or a combination thereof, are determined that are associated with the application process identifier. The determined one or more stored dynamic evaluation parameters or dynamic evaluation functions are sent to the dynamic evaluation engine.

The various innovations can be used in combination or separately. As described herein, a variety of other features and advantages can be incorporated into the technologies as desired. The foregoing and other objects, features, and advantages of the invention will become more apparent from the following detailed description, which proceeds with reference to the accompanying figures.

BRIEF DESCRIPTION OF THE DRAWINGS

FIG. 3 is a block diagram of an architecture where a dynamic evaluation engine, having a lambda object cache, of an application runtime is in communication with a dynamic evaluation service manager having a lambda object library.

FIGS. 5A and 5B are example pseudocode for calls to a dynamic evaluation engine.

FIG. 6 is example JAVA code for an application to register a process or function with a dynamic evaluation engine.

FIGS. 7A-7C present example JAVA code for a class that can service application requests to register processes or functions for use with a dynamic evaluation engine.

FIG. 8 is example JAVA code for packetizing lambda objects, such as to be sent to another computing system.

FIGS. 9A and 9B present example JAVA code for an interface for lambda objects.

FIG. 10 illustrates example JAVA code for an interface for mobile lambda objects.

FIG. 11 illustrates example JAVA code for an interface for service lambda objects.

FIG. 12 illustrates example JAVA code for a class that implements an interface for service lambda objects.

FIG. 13 illustrates example JAVA code for copying lambda objects.

FIGS. 14A and 14B illustrate example JAVA code for loading lambda objects from a repository.

FIGS. 15A and 15B illustrate example JAVA code for a priority function class.

FIGS. 16A and 16B illustrate example JAVA code for specific implementations, or derived classes, of a priority function class.

FIG. 17A is a flowchart of an example method for servicing an application method request for a prioritization value.

FIG. 17B is a flowchart of an example method of servicing an application method request for an evaluation result.

DETAILED DESCRIPTION

Example 1

Example Overview

Software programs, including applications, frameworks, and operating systems, often evaluate one or more parameters in determining when to take an action, how to take an action, and what action should be taken. For instance, a software program may manage the execution of multiple tasks. This management can include maximizing use of computing system resources (e.g., one or more processors, memory, network bandwidth, etc.), without overtaxing the computing system, and ensuring that tasks are completed in a timely way, including taking into account various priorities that may be associated with the tasks.

Typically, the parameters evaluated by a software program, and functions used to evaluate the parameters and which can return a result that can be used to guide execution of the software program, are fixed when the program is written. The parameters and functions are typically hard coded, such that that they are not updated (or updatable) unless and until a new version of the software program is available. Thus, it can be cumbersome to update software programs to change functions or parameters that are evaluated during program execution, including to add, remove, or modify functions or parameters that are used in the evaluation. Particularly in the case of software programs that are part of a larger collection, or which have expansive functionality, such as an application framework, an operating system, or function libraries, updates may be comparatively infrequent.

As an example, a computing system may need to schedule, swap, and prioritize different tasks, including different tasks by different users. As a more specific example, a cloud computing system may manage and execute tasks on behalf of many computing systems and devices. After a program is developed that includes code to carry out these function, the configuration of the cloud computing system may change, the number or type of serviced computing systems or devices may change, the relative priorities desired for different tasks may change, tasks may be added, changed, or removed, or other changes may occur that may impact how scheduling, swapping, and prioritization should be carried out. If changes are cumbersome to implement and apply, it may reduce the number of changes that are made, and the frequency at which the changes are made, which can result in less efficient use of system resource and less efficient execution of software functions. Accordingly, room for improvement exists in how software programs evaluate various parameters, including the parameters and functions that are to be evaluated.

Figure 1:
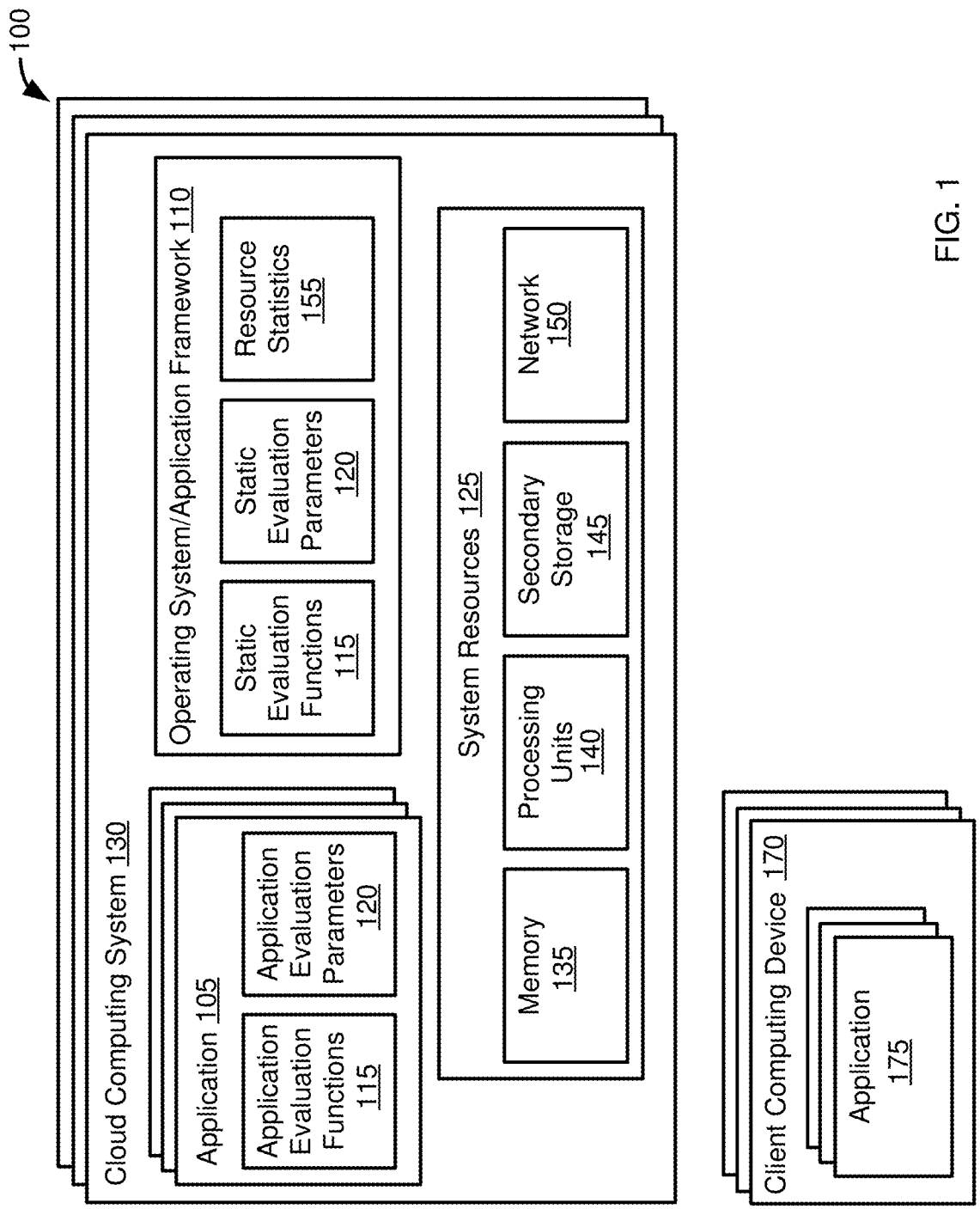
FIG. 1 is a block diagram of an architecture in which an application, or an application framework or operating system, evaluate static evaluation parameters using static evaluation functions.

FIG. 1 provides a block diagram of an example architecture 100 where various software programs, including applications 105 and an operating system or application framework 110, include application evaluation functions 115 (such as for prioritizing or scheduling processes) and application evaluation parameters 120. The application evaluation functions 115 and application evaluation parameters 120 can be static. That is, the application evaluation functions 115 and the application evaluation parameters 120 may be specified in program code for the applications 105 or the operating system/application framework 110. The application evaluation parameters 120 can include parameters associated with system resources 125 of a computing system or device 130 on which the applications 105 or framework/operating system 110 are being executed. The system resources 125 can include an amount of memory 135, one or more processing units 140, secondary storage 145, and network resources 150. The framework/operating system 110 can periodically determine and store resource statistics 155 regarding the amount of system resources 125 that are used or available. The resource statistics 155 can be a type of application evaluation parameter 120.

An application 105 can schedule processes (e.g., encrypt data, flush data to persistent storage, backup data over a network, handle actions requested by a user through a user interface, etc.) by evaluating the application evaluation parameters 120 using an application evaluation function 115. For instance, an application evaluation function 115 might indicate that a backup process should be executed if processor use is less than 60% and secondary storage (e.g., use of a buffer or interface device, or available space on the device) use is less than 70%. Similarly, the application framework/operating system 110 can schedule different processes, including processes of different applications 105, based on the nature of the processes and an application evaluation function 115 and one or more application evaluation parameters 120.

However, as mentioned, the application evaluation functions 115 and application evaluation parameters 120 are typically directly specified in program code. That is, the code specifies a function 115 that evaluates particular application evaluation parameters 120 in a particular way, and cannot be changed without changing the program code, where changing the program code typically involves installing a new version of the program.

In a specific example, the computing system 130 is a cloud computing system. The cloud computing system 130 can service one or more, typically a plurality, of client computing systems or devices 170. The client computing systems and devices 170 can execute one or more software applications 175. The software applications 175 can request information from, or tasks to be executed by, the cloud computing system 130. Although not shown in FIG. 1, in at least some cases, an application 175 can include static evaluation functions, static evaluation parameters, or a combination thereof.

In a specific scenario using the cloud computing system 130, an application 105 executing a request from an application 175 of a client computing device 170 can determine a priority for the request by evaluating an application evaluation function 115 using application evaluation parameters 120. However, because the functions 115 and parameters 120 are static, it may be difficult to adapt the architecture 100 to account for additional client computing devices 170 or applications 175, changes to the relative priorities of applications 175 or requests from different computing device 170, changes to the applications 105, including their relative priority, changes to the configuration of the client computing devices 170 (e.g., changes to their connection type, memory, processing capacity, etc.), changes to the system resources 125 of the cloud computing system 130, or changes to the topology of the cluster servicing the application. For instance, in order to account for these changes, an update to the application 105 can be made, including its application evaluation functions 115 or application evaluation parameters 120.

However, because the functions 115 and parameters 120 are static, the change may be accomplished by updating or replacing the application 105 which, as described above, and can be cumbersome and time consuming. In addition, the application evaluation functions 115 and application evaluation parameters 120 are typically the same, and applied in the same way, for different cloud computing systems 130 and different client computing devices 170. That may limit flexibility if, for example, a cloud computing system 130 located in a first geographical region has application evaluation functions 115 and application evaluation parameters 120 that have been optimized for a second geographical region, and so may be suboptimal for the first geographical region.

Example 2

Example Architecture with Dynamic Evaluation Engine

Figure 2:
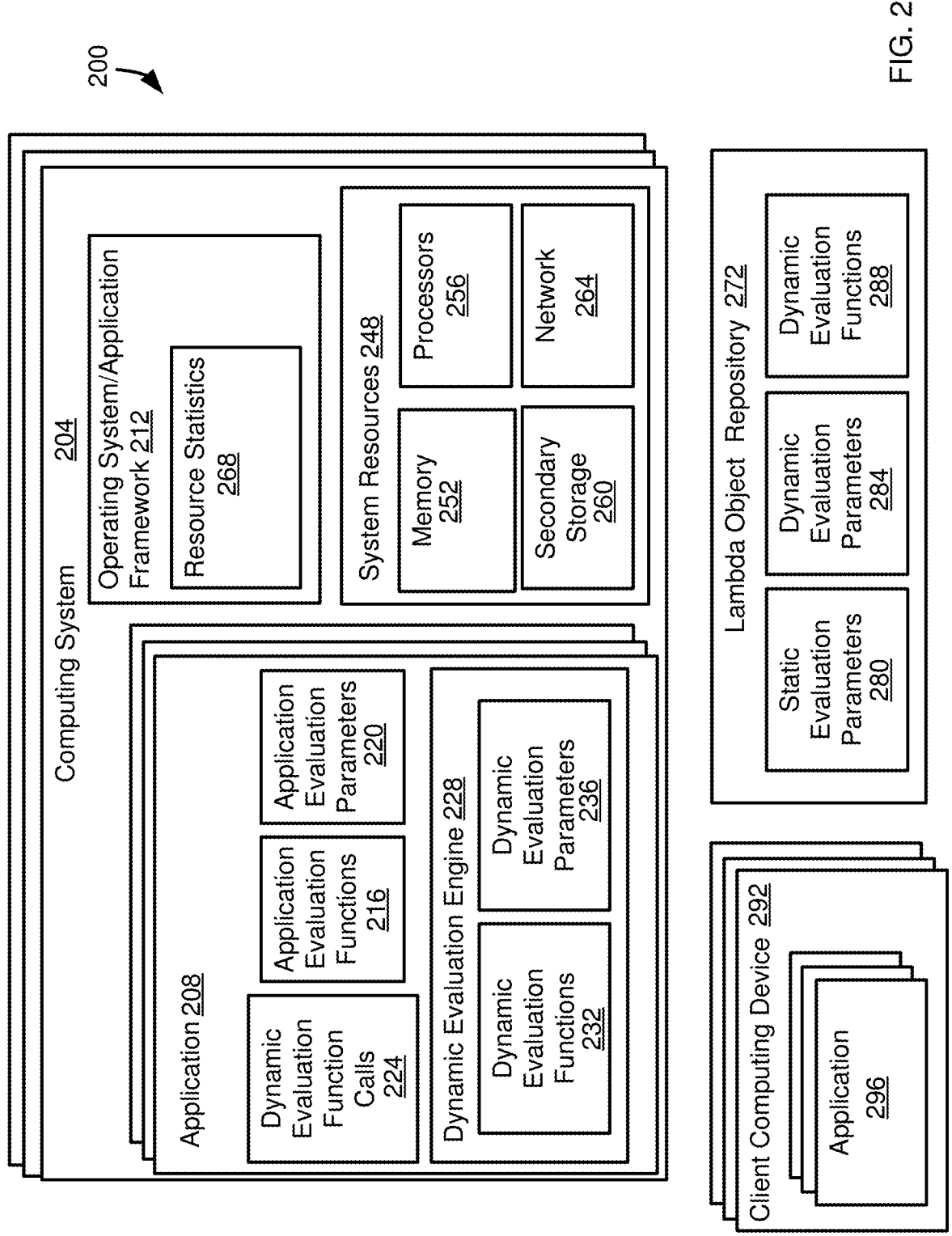
FIG. 2 is a block diagram of an architecture in which an application runtime can include a dynamic evaluation engine that is in communication with a lambda object repository that includes dynamic evaluation functions and dynamic evaluation parameters.

FIG. 2 illustrates a block diagram of an architecture 200 that can overcome limitations of programs which use application-specified functions to evaluate application-specified parameters. The architecture 200 provides an application runtime where evaluation functions and parameters can be dynamically associated with application methods during runtime. That is, functions and parameters used to provide an evaluation result to a particular application method can be added, removed, modified, or combined in different ways during runtime. The functions and parameters used to provide an evaluation result can include dynamic functions that can use one or more application-specified parameters, one or more dynamic parameters, one or more application-specified functions, or a combination thereof.

Functions which can change during application runtime (e.g., being added, removed, or modified) can be referred to as dynamic evaluation functions, or lambda functions. Parameters which can change during application runtime (e.g., being added, removed, or modified, including with respect to a dynamic function) can be referred to as dynamic evaluation parameters, or lambda parameters. Lambda parameters and lambda functions can be types of lambda objects, where lambda objects can be data types (e.g., abstract data types) used to help implement dynamic portions of a dynamic evaluation engine of the application runtime. An application method can request an evaluation result, but the details of the evaluation are abstracted from the method, and can be changed dynamically without affecting the operation of the method, or requiring a change in the method code.

The architecture 200 can include one or more computing systems 204. A computing system 204 can be a single physical device or a collection of multiple physical devices. Each computing system 204 can include one or more applications 208 and one or more application frameworks or operating systems 212. The one or more applications 208 can include one or more application evaluation functions 216 and one or more application evaluation parameters 220, where an application evaluation function can use one or more of the application evaluation parameters. The application evaluation functions 216 and application evaluation parameters 220 can be implemented at least generally as described for the application evaluation functions 115 and the application evaluation parameters 120 of FIG. 1.

The one or more applications 208 can include one or more dynamic evaluation function calls 224 (e.g., calls by various methods or processes of an application). The dynamic function calls 224 can be to a dynamic evaluation engine 228. The dynamic evaluation engine 228 can include one or more dynamic evaluation functions 232 and one or more dynamic evaluation parameters 236. The dynamic evaluation engine 228 can access the application evaluation functions 216 and the application evaluation parameters 220.

As used herein, a dynamic evaluation function or a dynamic evaluation function is one that can be dynamically associated with an application process that is associated with an application method request for an evaluation result (e.g., a dynamic evaluation function call 224). That is, dynamic evaluation functions and dynamic evaluation functions can be added or removed from an evaluation of a particular request, or can be modified. Application evaluation functions and Application evaluation parameters are those that are not dynamically associated with a request, either being directly specified in the application code, or being statically specified for a particular evaluation request to the dynamic evaluation engine (e.g., in some cases, a prioritization evaluation may always use CPU load as an evaluation parameter, or a particular calculation, according to a particular function, in determining priority).

A dynamic evaluation function call 224 can be associated with one or more dynamic evaluation functions 232, one or more application evaluation functions 216, or a combination thereof. A dynamic evaluation function 232 can be associated with one or more dynamic evaluation parameters 236, one or more application evaluation parameters 220, or a combination thereof. An application evaluation function 216 is typically associated with one or more application evaluation parameters 220.

Each computing system 204 can include system resources 248. System resources 248 can include memory 252, one or more processors 256, secondary storage 260, and network resources 264. An amount of available system resources 248 can be periodically determined, such as by the application framework/operating system 212, and stored as resource statistics 268. The resource statistics 268 can serve as application evaluation parameters 220 or dynamic evaluation parameters 236.

Dynamic evaluation functions 232 and dynamic evaluation parameters 236 can be updated as desired. Because the details of the dynamic evaluation functions 232 and dynamic evaluation parameters 236 are abstracted from methods of the applications 208, changes can be made at any time to the dynamic evaluation functions and dynamic evaluation parameters without affecting the operation of the applications 208. In some cases, updates to dynamic evaluation functions 232 or dynamic evaluation parameters 236 can be applied to a single computing system 204, or specified computing systems. For instance, an administrator of a computer system may make such updates. In other cases, updates to dynamic evaluation functions 232 or dynamic evaluation parameters 236 can be applied to a single computer system 204, a collection of computer systems, or all computer systems, from a centralized lambda object repository 272. The lambda object repository 272 can include repositories of static evaluation parameters 280, dynamic evaluation parameters 284, and dynamic evaluation functions 288 that can periodically be sent (e.g., as JAVA class files) to one or more of the computing systems 204 to serve as the dynamic evaluation functions 232 or the dynamic evaluation parameters 236.

In a particular aspect, a computing system 204 can be a cloud computing system (which in turn can be formed from multiple physical computing devices) that can service requests from one or more, typically a plurality, of client computing devices 292. The client computing devices 292 can execute software applications 296 that can request information from, or processing to be performed by, an application 208 of a cloud computing system 204. Although not shown, in some cases, the applications 296 can make dynamic evaluation calls, which can be processed by an application 208 or can be otherwise serviced by the dynamic evaluation engine 228.

The architecture 200 is thus advantageous because changes to evaluations used by applications 208 can be made without updating the applications themselves. Changes can simply be made to the dynamic evaluation engine 228, and the updated dynamic evaluation parameters 236 and dynamic evaluation functions 232 (including their combination with application evaluation functions 216 or application evaluation parameters 220) will be used for subsequent calls 224. This arrangement allows updates to be made more easily, and can result in updates being applied more frequently, which can improve use of the system resources 248 and improve the operation of the applications 208, including by executing processes more rapidly, and, when the dynamic evaluation engine 228 is used for scheduling or prioritizing tasks, with a priority that better matches the needs of the computer system 204 (e.g., to correspond with a current use of the computing system).

The dynamic evaluation function calls 224, and their corresponding dynamic evaluation functions 232, and the associated dynamic parameters 236 and/or static evaluation functions 216 and static evaluation parameters 220, can be used for a variety of purposes. In a particular example, the dynamic evaluation functions 232 are used to establish, at least in part (e.g., in combination with application evaluation functions 216 or application evaluation parameters 220) a relative priority for, or to otherwise schedule or manage the execution of different methods or processes of different applications 208, including methods or processes associated with various client computing devices 292.

For instance, a determined priority may be used to indicate whether a given application method or process, should be executed immediately, or should be suspended for a period of time so that other application methods or processes can be executed. In addition to taking into account available system resources 248, a dynamic evaluation function 232 can evaluate parameters (which can be dynamic parameters 236) that can influence a priority given to an application method, such as a service level associated with a user of the method (which can be, for example, a client computing device 292). Dynamic parameters 236 can also include a location (e.g., a location of the computing system 204), a time of day at the location of the computing system, a day of the week at the location of the computing system, a country in which the computing system is located, a number of computing systems in a group of computing system, a load (e.g. processor, memory use, network) on a collection of computing systems, a number of computing devices or systems services by another computing system (e.g., a data center or a cloud computing system), a load on a particular application system running on one or more computing systems, a load on a specific database system or schema (which can be running on a single computing system or on multiple computing systems), a load (e.g., input/output operations per second for a rack, or another measure of processor, memory, or performance or use of the rack) on a particular computing device in a data center (e.g. implementing a cloud computing system), an identifier for a computing system or a particular device of a computing system (e.g., an identifier for a particular rack in a data center), a location from a requesting source (e.g., a distance between a client computing system or device and a cloud computing system/data center, or a particular computing device thereof), a value based on processing rules associated with an application 208, 296 (e.g., corresponding to an analog-world process, such as end of month, end of quarter, or end of year processing, or other dates that may be associated with increased activity).

In some cases, how priority should be computed cannot be determined when an application 208 is initially written or deployed, or it may be desirable to change how priority is computed after the application is written or deployed. As noted above, in typical systems, such as the architecture 100, such changes are typically not possible without installing a new version of the application. The disclosed technologies facilitate rapid changes to how priority is determined (or, more generally, how evaluations are carried out). In particular, changes can be made to how priority is determined, and such changes propagated at runtime so that the functionality of the application 208 can adapt itself to current conditions. In addition, the changes can be specific to the specific computing system 204 on which the application 208 is executing, such that different computing systems can operate different ways that may be most desirable for the various computing systems.

When a dynamic evaluation function 232 is used, at least in part, to schedule or prioritize application methods, prioritization can be applied to, for example, compute a load factor for message priority based on a computing load at a computer system 204 and on an application 208, to compute a load factor to use in encrypting data (e.g., determining when an encryption task should be executed and an execution batch size), to schedule execution of a task to reshape a database schema, to determine when to run a particular process of an application 208 (e.g., a task that is likely to require an abnormally large amount of system resources 248, such as end of month financial reporting), to determine how to reshape or resize a cluster of computing systems or devices (e.g., how to associate client computer devices 292 with particular computing systems 204), to determine how to associate particular client computing systems or devices 292 with particular hardware components of a particular computing system 204 (e.g., how to associate particular client computing systems or devices with particular computing devices making up the computing system), and executing methods of applications 208 based on different geographical (e.g. county-specific) rules.

Example 3

Example Advantages

The disclosed innovations, including the dynamic evaluation engine 228 and the lambda object repository 272 of FIG. 2, can provide a number of advantages. For instance, by allowing application methods to request evaluation results from an evaluation engine of the application, rather than having the evaluations carried out directly in the application code for the method, the evaluations can be more easily changed. That is, the application method can be written to use the results of the evaluation, and the details of the evaluation can be hidden, or abstracted, from the application method. Thus, the way the evaluation result is determined can be changed, dynamically, without having to modify the code of the application method or interrupt the execution of the application. The disclosed technologies allow dynamic evaluation functions and dynamic evaluation methods to be added, removed, and changed in the application runtime.

Abstracting the evaluation can also allow greater flexibility because different computing systems or devices, including cloud computing systems, can execute the same application code, but can be associated with different evaluation functions or evaluation parameters. This can allow for evaluations to be tailored for a specific computing system, rather than having evaluation be coded to an "average" value, which may not be as efficient for individual computing devices. This abstraction can also allow for evaluations to be updated at any time, without having to wait for an update to an application itself. Thus, evaluations can be updated more frequently, as well as being tailored to specific computing systems or devices (e.g., applications running in different geographical locations, cloud computing systems or data centers located in different geographical locations, and even different processors or nodes within a particular cloud computing system or data center).

The flexibility provided by the disclosed innovations can reduce programming and administrative burdens related to updating evaluation functions (e.g., since an entire application does not need to be modified, distributed, and installed). The disclosed innovations can also improve the operation of computing systems, as the evaluation functions can result in improved use of system resources, such as more optimal use of memory, network resources, or processor capacity. These improvements, in turn, can allow programs to be executed more quickly, and help to achieve an appropriate level of concurrent program execution.

The disclosed innovations can also, at least to a degree, help decouple application method logic from evaluation logic associated with evaluation results used by the application method. That is, as discussed above, an application method can use the results of an evaluation by knowing what the result represents, but without necessarily knowing the details (or anything) about how the result is calculated. As an example, an application method may use an evaluation result to determine how to prioritize or schedule actions. The result may represent, for example, a degree of computing resource availability, but the application method can use the result without knowing how the result was calculated. The evaluation function used by the application method can be modified to provide more precise measures of system resource use, or to account for changes to the available resource (e.g., the addition of additional memory or processors) even though the evaluation function may be agnostic as to how its results are used, or what application methods are using them.

The disclosed technologies can provide benefits over using an external service, particularly a service located on a remote computing system, to provide evaluation results. For example, a particular computing system on which an application is running may be associated with particular resources or other parameters that may not be available at a remote service, and a particular application may be associated with particular parameters (e.g. allocated memory, buffer sizes, CPU usage, etc.) with respect to a particular computing system on which the application is running. Thus, it can be beneficial to generate evaluation results in the application runtime. The present technologies facilitate such functionality by providing a mechanism to import functions and parameters into an application's runtime without restriction from normal mechanisms to protect memory into which application methods are loaded.

Example 4

Example Architecture with Dynamic Evaluation Engine and Dynamic Evaluation Service Manager FIG. 3 illustrates an example architecture 300 where an application 308 executed by a computing system 304 can call a dynamic evaluation engine 312 of the application to provide evaluation results to methods or process of the application, and the dynamic evaluation engine 312 can receive new or updated dynamic evaluation functions or dynamic evaluation parameters from a dynamic evaluation service manager 314 operating on a remote computing system 316, which in turn can receive dynamic evaluation functions or dynamic evaluation parameters from one or more lambda sources 320. In some cases, the computing system 304 can be a cloud computing system, or otherwise configured to service requests for information or processing by one or more client computing systems or devices (not shown, at least analogous to the client computing devices 292 of FIG. 2). The computing system 304 can be one of a plurality of computing systems that are in communication, and cooperate, with the remote computing system 316.

The application 308 can execute one or more functions or processes 324, and each function or process can be associated with one or more evaluation calls 328. An example evaluation call 328 is a call to determine a priority or scheduling action to be taken with respect to one of the functions or processes 324, such as whether the function or process should be immediately executed or have execution deferred for a period of time (and, optionally, the deferment time period). The application 308 can also include one or more application evaluation functions 330, one or more application evaluation parameters 332, or a combination thereof, which can be directly executed by a function/ process 324 of the application 308, or can be used by the dynamic evaluation engine 312.

The evaluation calls 328 are made to the dynamic evaluation engine 312. The evaluation calls 328 can be specified in program code (e.g., application program code), and the results used by functions/processes 324 of an application 308, but the evaluation is carried out by the dynamic evaluation engine 312. The dynamic evaluation engine 312 is part of the runtime of the application 308.

A function or process 324 can be registered with the dynamic evaluation engine 312, and in turn the dynamic evaluation service manager 314. At registration, or at another time, evaluation functions (dynamic, static, or both) and evaluation parameters (dynamic, static, or both) can be assigned to the function or process 324. In at least some cases, the assigning can be carried out by the dynamic evaluation service manager 314. For example, particular operational parameters for an application 308 can be determined (e.g., by a developer or system administrator), and appropriate dynamic evaluation functions 340 and dynamic evaluation parameters 344 specified for particular functions/ processes 324 (e.g., application methods) via the dynamic evaluation service manager 314, including changes to previously specified dynamic evaluation functions and parameters.

The dynamic evaluation engine 312 (which can be a component or module of the application 308) can determine the appropriate evaluation function to be used for the evaluation call 328, which can be a call to an application evaluation function (e.g., 216 of FIG. 2) or a call to a dynamic evaluation function 340 stored in a lambda object cache 336. The lambda object cache 336 can also store dynamic evaluation parameters 344. In some cases, a dynamic evaluation parameter 344 can be used by multiple dynamic evaluation functions 360. In particular examples, the dynamic evaluation functions 340 and dynamic evaluation parameters can be JAVA class files, or files that otherwise can be loaded into the runtime of the application 308 (e.g., text files that can be read by an interpreter for the application 308 or dynamically linked files). In some aspects, objects in the lambda object cache 336 (e.g., JAVA class files) can be persisted, while mappings between objects in the lambda object cache and functions/processes 324 can be maintained in-memory, but optionally retrieved from the dynamic evaluation service manager 314 (where they can be persisted) if the application 308 is restarted.

The dynamic evaluation engine 312 can access the application evaluation functions 330 and application evaluation parameters 332. In some cases, an evaluation result can be produced by evaluating a combination of dynamic evaluation functions 340, a combination of application evaluation functions 330 (where the combination is defined dynamically), or a combination of dynamic and application evaluation functions. Similarly, a dynamic evaluation function 340 can use dynamic evaluation parameters 344, application evaluation parameters 332 (where the way the application evaluation parameters are evaluated is dynamic), or a combination of dynamic and application evaluation parameters. For instance, in calculating a prioritization value, a dynamic evaluation function 340 may use a set combination of application evaluation parameters 332 (e.g., it may always use available memory and processor use), but may use dynamic evaluation parameters 344 as well, such as parameters based on a location of the computing system 304, computing systems and devices serviced by the computing system, rules based on a time of day or time of the year, etc.

Once the dynamic evaluation engine 312 determines one or more appropriate dynamic evaluation functions 340 or dynamic evaluation parameters 344 to be used, the dynamic evaluation engine can determine (such as when an evaluation call 328 is received, when a particular function/processes 324 is initiated, or the application 308 is executed) whether that dynamic evaluation function or dynamic evaluation parameter is present in the lambda object cache 336. If a version of the dynamic evaluation function 340 or dynamic evaluation parameter 344 is present in the lambda object cache 336, the dynamic evaluation engine 312 can determine whether any cached version of the dynamic evaluation function or dynamic evaluation parameter is valid. If the dynamic evaluation function 340 or dynamic evaluation parameter 344 is not present, or the stored version is invalid, the dynamic evaluation engine 312 can request the dynamic evaluation function (including an updated version of the function) or the dynamic evaluation parameter (including an updated version of the parameter) using an update processor 348.

Before executing a dynamic evaluation function 340, and its dynamic evaluation parameters 344 (or application evaluation parameters 332 or application evaluation functions 330), the dynamic evaluation engine 312 can determine whether valid execution results exist in a result cache 356. The result cache 356 can include results of previous function evaluations 360 and computed values 364 that were determined as part of determining the previous function evaluations. Computed values 364 can include values calculated for, or otherwise associated with, one or more of the dynamic evaluation parameters 344, or can include intermediate calculations produced in evaluating a dynamic evaluation function 340. The result cache 356 can be useful in speeding the generation of an execution result for a dynamic evaluation function 340 when the function and its dynamic evaluation parameters 344 are unchanged compared with a prior execution. Function evaluations 360 and computed values 364 can be periodically removed from the result cache 356 as the cache becomes full. In a specific example, the result cache 356 can maintain most recently used values of the function evaluations 360 and the computed values 364, with least recently used values being deleted from the result cache when the size of the result cache exceeds a determined size.

The computing system 308 can be in communication, such as over a network (e.g., the internet or an intranet), with the remote computing system 316. The remote computing system 316 can be used to populate or update the lambda object cache 336 of the computing system 308. The remote computing system 316 can include the dynamic evaluation service manager 314 that can serve to process requests from the update processor 348. In particular, the dynamic evaluation service manager 314 can include an update request processor 376. The update request processor 376 can determine whether requests from an update processor 348 are valid and what dynamic functions or dynamic parameters are responsive to a request. The update request processor 376 can be in communication with a lambda object library 380. The lambda object library 380 can serve as a repository for dynamic evaluation functions 382 and dynamic evaluation parameters 384.

The dynamic evaluation service manager 314 can include a rules engine 386 which can import, classify, and combine dynamic evaluation functions and dynamic evaluation parameters, and then store the dynamic evaluation functions and dynamic evaluation parameters in the lambda object library 380. The dynamic evaluation service manager 314 can also include a cache invalidation service 388. The cache invalidation service 388 can be used to invalidate dynamic evaluation functions 340 or dynamic evaluation parameters 344 of the lambda object cache 336, or the function evaluations 360 or computed values 364 of the result cache 356. Cache invalidation can occur for a variety of reasons, including an explicit invalidation request (e.g., from a system administrator), scheduled/periodic invalidation, or invalidation based on the receipt of a new version of a dynamic evaluation function 382 or a dynamic evaluation parameter 384.

The dynamic evaluation service manager 314 can include other functionality. For instance, the dynamic evaluation service manager 314 can persist information associated with the dynamic evaluation engine 312, including associations between functions/processes 324 and dynamic evaluation functions 340 and dynamic evaluation parameters 344 and particular evaluation calls 328. In at least some cases, functions/processes 324 can be registered when the application 308 is first deployed, with updates being applied thereafter through the dynamic evaluation service manager 314.

The remote computing system 316 can include, or be in communication with, the one or more lambda sources 320. The lambda sources 320 can be used, for example, to call the cache invalidation service 388, to add, delete, or modify dynamic evaluation functions 382 or dynamic evaluation parameters 384, or to assign dynamic evaluation functions or parameters to specific application processes. Although shown as located on the remote computing system 316, one or more, including all, of the lambda sources 320 can be located on a different computing system or device, including the computing system 308.

The lambda sources 320 can include system rules 390. The system rules 390 can supply dynamic evaluation functions and dynamic evaluation parameters, including specifying how evaluation functions (static, dynamic, or a combination of the two) should be combined for a particular evaluation. That is, an evaluation function can be a composite function that includes a plurality of dynamic evaluation functions, static evaluation functions, or a combination thereof. System rules 390 can include rules based on the nature of one or more computing systems 308 (or client computing systems or devices making a request to a computing system 308), including the location of the computing system, the relative priority of the computing system, how computing systems may be clustered together, and system resource use or other operating parameters associated with a computing system.

The lambda sources 320 can include application rules 392. The application rules 392 can specify rules that can apply to particular applications 304 running on a computing system 308 (or on a client computing device or system in communication therewith). Maintaining a centralized, or master, source of dynamic evaluation functions and dynamic evaluation parameters can allow applications 304 to have consistent operation at different computing systems 308, or different dynamic evaluation functions or dynamic evaluation parameters can be specified for particular computing systems.

The lambda sources 320 can include data object rules 394, where dynamic evaluation functions and dynamic evaluation parameters can be specified for various data types, including logical data objects representing analog-world processes, such as invoices, employee records, accounting processes, and the like. The lambda sources 320 can include a governance system 396, which can be used, such as by system administrators, to govern the functions or processes 324 of applications 308 running on a computing system 304. One or more of the lambda sources 320 may be permitted to call the cache invalidation service 388 to invalidate the lambda object cache 336 or the result cache 356 of one or more computing systems 308, or selected dynamic evaluation functions 340 or dynamic evaluation parameters 344 of the lambda cache 336, or selected function evaluations 360 or computed values 364 of the result cache 356.

Example 5

Example Processing of Request to Dynamic Evaluation Engine

Figure 4:
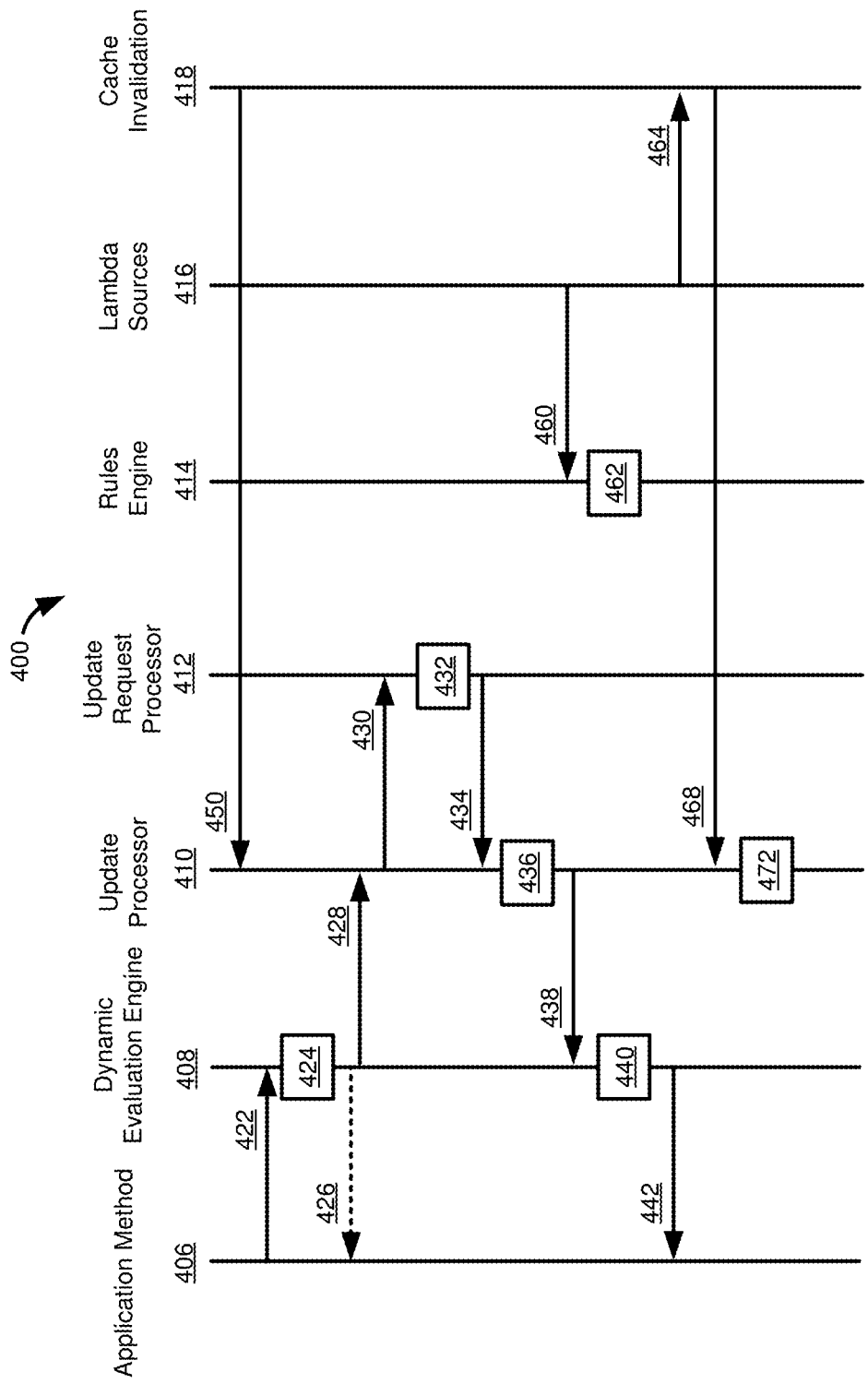
FIG. 4 is a timing diagram illustrating processing of a request by an application method to a dynamic evaluation engine of the application's runtime.

FIG. 4 illustrates a timing diagram of various processes that may occur using the architecture 200 of FIG. 2 or the architecture 300 of FIG. 3. FIG. 4 illustrates timelines for an application method 406, a dynamic evaluation engine 408, an update processor 410, an update request processor 412, a rules engine 414, lambda sources 416, and a cache invalidation service 418. These components can be at least analogous to the components discussed in conjunction with FIG. 3.

An application method 406 makes a call 422 to the evaluation engine 408. The call 422 is to perform an evaluation associated with the method 406. In a specific example, the call 422 can be to determine a priority or scheduling operations with respect to the method 406, such as whether the method (e.g., a thread associated with the method) should be immediately executed, or scheduled for delayed execution, including determining a delay amount. The call 422 can include one or more of an application identifier and an application method identifier associated with the particular application method 406. The call 422 can include additional information, including an identifier for a computing device or system that is the source of the call 422, or authorization information.

The dynamic evaluation engine 408 of the application associated with the application method 406, at 424, determines a dynamic evaluation function associated with the application method 406. At 424, the dynamic evaluation engine 408 can determine whether the dynamic evaluation function/parameters are present in a lambda object cache (e.g., the lambda object cache 336 of FIG. 3), and, if so, whether the cached evaluation functions/parameters remain valid.

If the cached evaluation functions/parameters are stored in the cache and are valid, the dynamic evaluation engine 408, also at 424, can determine whether any corresponding function evaluations or computed values are stored in a result cache (e.g., the result cache 356 of FIG. 3). The dynamic evaluation engine 408 can determine evaluation results and return evaluation results 426 to the application method 406, including any cached function evaluations or computed values.

If it was determined at 424 that the lambda cache did not include the appropriate dynamic evaluation function or dynamic evaluation parameters, or the dynamic evaluation function or dynamic evaluation parameters were invalid, the dynamic evaluation engine 408 sends a request 428 to the update processor 410 for the dynamic evaluation function or dynamic evaluation parameters (or both) needed for the call 422. In turn, the update processor 410 can send a request 430 to the update request processor 412 for the dynamic evaluation function or the dynamic evaluation parameters. The request 428 and/or the request 430 can include information to be used to retrieve the appropriate dynamic evaluation function or dynamic evaluation parameters. For instance, a request 428, 430 can include an identifier for the application method 406, an identifier for the application with which the application method 406 is associated, or a combination thereof. A request 428, 430 can also include security information, such as credentials that can be checked by the update request processor 412 at 432 to determine that the request 430 is valid or authorized.

At 432, if the request is valid/authorized, the update request processor 412 can retrieve the appropriate dynamic evaluation function or dynamic evaluation parameters from a library (e.g., the lambda object library 380 of FIG. 3). The update request processor 412 can send the appropriate dynamic evaluation function or dynamic evaluation parameters to the update processor 410 in response 434. At 436, the update processor 410 can store the received dynamic evaluation function or dynamic evaluation parameters in the lambda object cache, and can send a notification 438 to the dynamic evaluation engine 408 that the dynamic evaluation function and dynamic evaluation parameters needed to execute the call 422 are available. At 440, the evaluation engine 408 can evaluate the dynamic evaluation function using the dynamic p evaluation parameters (and, optionally, one or more application parameters), and store the execution results, including intermediate or computed values, in the results cache. The evaluation engine 408 can return execution results 442 to the application 406 method.

Although the description above was with respect to a call 422, the same, or analogous, operations can occur at other times. For instance, when a computing system, or a particular application associated with the method 406, is initially booted or loaded, or the method 406 is initially executed, the call 422 can represent a startup process to determine whether any evaluations that may be needed by an application method 406 have the current, appropriate dynamic evaluation functions and dynamic evaluation parameters available in the lambda object cache. If the dynamic evaluation functions or dynamic evaluation parameters are not present, or are not current, the current version can be retrieved from the library that is in communication with the update request processor 412. In this way, execution of requests 422 generated during application execution can be expedited, as fewer requests may need to be made to the update request processor 412.

FIG. 4 illustrates a cache invalidation operation 450 sent from the cache invalidation service 418 to the update processor 410 (which, although not shown, can be mediated by the update request processor 412, in some implementations). The cache invalidation operation 450, when received by the update processor 410 prior to the receipt of the call 422 by the dynamic evaluation engine 408, can trigger the retrieval and storage of updated dynamic evaluation parameters or dynamic evaluation functions at 430, 432, 434, 436.

FIG. 4 also illustrates a process for updating dynamic evaluation functions and dynamic evaluation parameters by lambda sources 416. At 460, the lambda sources 416 push a new dynamic evaluation function or new dynamic evaluation parameters to the rules engine 414. At 462, the rules engine 414 can determine which applications 406, including individual functions or processes thereof, to which the updated dynamic evaluation functions or dynamic evaluation parameters should be applied, including how any changes (e.g., new, modified, or deleted dynamic evaluation functions or dynamic evaluation parameters) should be reconciled with existing dynamic evaluation functions or dynamic evaluation parameters. The rules engine 414 can then, also at 462, store the updated dynamic evaluation function or dynamic evaluation parameters in the lambda object library. The lambda sources (or, alternatively, the rules engine 414) can send a call 464 to the cache invalidation service 418, which can send a cache invalidation message 468 to the update processor 410. The update processor, at 472, can mark the corresponding dynamic evaluation function or dynamic evaluation parameters as invalid in the lambda object cache. Alternatively, the rules engine 414 can (such as by calling the update request processor 412) send the updated dynamic evaluation function or dynamic evaluation parameters to the update processor 410 to be stored in the lambda object cache.

Example 6

Example Evaluation Function Calls

FIGS. 5A and 5B illustrate pseudocode for example application processes or functions having evaluation calls to a dynamic evaluation engine. In particular, FIG. 5A illustrates a function or method to send a message, and includes a call to a prioritization engine (e.g., a dynamic evaluation engine that includes evaluations associated with prioritization or scheduling), PFunction, to assign a priority to the message. The PFunction service can include dynamic evaluation functions, such as, with reference to FIG. 3, a dynamic evaluation function 340 stored in the lambda object cache 336 of the dynamic evaluation engine 312 that can be called by an application 304. The call to PFunction includes a particular identifier associated with the calling application, and a particular identifier associated with the particular function or process associated with the call.

Similarly, FIG. 5B illustrates a function or method to encrypt data, and includes an evaluation call to a prioritization service, PFunction, to assign a sleep or wait time to the encryption operation. PFunction can be associated with a dynamic function, as described above for FIG. 5A. The call to PFunction again includes identifiers for the calling application and its associated process or function. Once the sleep or wait time is retrieved (by PFunction retrieving and evaluating the appropriate dynamic evaluation functions and dynamic evaluation parameters), the process thread associated with the encryption operation is set to sleep for the time returned by the evaluation call, and then the encryption process is executed.

Although the calls to the dynamic service in FIGS. 5A and 5B are shown as including the application id and function id, in at least some aspects, other arguments can be sent to be used in evaluating dynamic functions.

Example 7

Example Application Process/Function Registration

FIG. 6 illustrates example code in the JAVA programming language for a PrioritizationProxy class that can be used to register an application process with a dynamic evaluation engine, PFunction. That is, the method can be used by an application to register a new function or process of the application with a dynamic evaluation engine. The registration function (registerPFunction) takes as arguments a name or identifier for the function, an application identifier, and authentication information (secretCode) that can be used to ensure that the calling application method is authorized to execute the dynamic evaluation function.

FIG. 6 also illustrates example JAVA code for retrieving dynamic evaluation functions (LambdaFunctions) and dynamic evaluation parameters (LambdaParameters). These methods take as arguments an identifier for the relevant application function, an identifier for the application, and the authentication information (secretCode).

Example 8

Example Application Process/Function Registration at Dynamic Evaluation Engine

FIG. 7A-7C illustrate example code in the JAVA programming language for a class that can be used to service application requests to register processes or functions for dynamic evaluation function evaluation requests (e.g., using the class of FIG. 6), as well as requests from lambda sources (e.g., sources to add, remove, or change dynamic evaluation functions or dynamic evaluation parameters. With reference first to FIG. 7A, the PrioritizationService class can be configured and managed using an inversion of control container, such as using the Spring Framework (Pivotal Software, Inc., of San Francisco, Calif.). In particular, the PrioritizationService class can be associated with a logging service, a service to retrieve application priorities, an encryption service, an authentication service, and a validation service.

The PrioritizationService class can include a method ("register") to register dynamic functions. For instance, the registration method can be called by the registration function of FIG. 6. The registration function can confirm that the arguments supplied to the method (a unique name for the function, an identifier associated with the application, and the authentication information) are not null, and that the unique name is unique (e.g., a registered function does not already exist having the same value for uniqueName). If these checks pass, the function can be registered, otherwise an exception can be thrown.

As illustrated in FIG. 7B, the PrioritizationService class can also include methods to return dynamic functions or parameters associated with a particular function and application provided as arguments, such as when called by an application through the corresponding functions of FIG. 6. The methods can determine whether any of the arguments are null, and whether the correct authentication information has been supplied. If these tests pass, the relevant information (dynamic evaluation functions or dynamic evaluation parameters) can be returned. Otherwise, an exception can be thrown.

In FIG. 7C, the run method can be a bootstrap method that is executed (typically once) when the PrioritizationService is initialized. The run method can be used to set up the object and related caches and events system Example 9

Example Dynamic Object Packetization

FIG. 8 illustrates example code in the JAVA programming language for a PacketCreator class, having a createPacket method, that can be used to create a packet that can be used to transmit a dynamic function or a dynamic parameter. For instance, with reference also to FIG. 3, the createPacket method can be used to send dynamic evaluation functions or dynamic evaluation parameters from the lambda object library 380 to the computer system 304 to be stored in the lambda object cache 336.

Example 10

Example Base Lambda Object Interface

FIGS. 9A and 9B illustrate example code in the JAVA programming language for an interface for lambda objects, such as dynamic evaluation functions or dynamic evaluation parameters. The interface, "ILambda," includes data members representing action codes for transferring, securely transferring, or destroying the lambda object. The interface includes methods that a lambda object should implement using these action codes, including a method that includes only the action code and a method that includes the action code and connection (e.g. network) parameters to be used in executing the action. The interface also specifies that classes implementing ILambda should include methods for initializing lambda objects, creating lambda objects, setting and retrieving a name of the lambda object, and to set a location for the lambda object (e.g. lambdabase).

Example 11

Example Interface for Mobile Lambda Objects

FIG. 10 illustrates example code in the JAVA programming language for an interface for mobile lambda objects, such as dynamic evaluation functions or dynamic evaluation parameters that are to be transmitted to another computing system. The interface, IMobileLambda, can extend the ILambda interface described in conjunction with FIGS. 9A and 9B. The IMobileLambda interface can specify that a class implementing the interface should include methods to set a home address for the object, to obtain the home address for the object, one or more actions to take when an object is received, one or more actions to be taken when an object is to be sent, and a method to return the object to its source (e.g., its lambdabase of origin, or at least the last assigned value of "home address").

Example 12

Example Interface for Service Lambda Objects

FIG. 11 illustrates example code in the JAVA programming language for an interface for service objects. The interface, IServiceLambda, extends the ILambda interface described in conjunction with FIGS. 10A and 10B. The IServiceLambda interface specifies a method to handle a particular service request, and returns an object containing the result of the request. The IServiceLambda can be used, for example, to push updates to multiple applications/computing systems concurrently, which can be useful, for example, when it is desired to clean up computing systems or rebalance workloads amongst computing systems. In at least some cases, the IServiceLambda can be used to cause an application to execute functionality that is not directly associated with an evaluation request of an application method.

Example 13

Example Class for Service Lambda Objects

FIG. 12 illustrates example code in the JAVA programming language for ServiceLambda class that implements the IServiceLambda interface of FIG. 11. The ServiceLambda class. The IServiceLambda implements all of the method of the ServiceLambda interface and its parent interfaces. The interface, IServiceLambda, extends the ILambda interface described in conjunction with FIGS. 9A and 9B. The IServiceLambda interface specifies a method to handle a particular service request, and returns an object containing the result of the request.

Example 14

Example Lambda Object Copy Class

FIG. 13 illustrates example code in the JAVA programming language for a class to make deep copies of lambda objects, such as dynamic evaluation functions or dynamic evaluation parameters. The class, "Cloner," serializes the source object to an output stream, and then reads the output stream and assigns the value to a new object of the appropriate type.

Example 15

Example Lambda Object Loader Class

FIG. 14A illustrates example code in the JAVA programming language for a class for retrieving lambda objects, such as dynamic evaluation functions or dynamic evaluation parameters, from a repository, which can be, for example, and with reference to FIG. 3, the lambda object cache 336 or the lambda object library 380. For example, the loader can be used to load dynamic evaluation functions or dynamic evaluation parameters in the form of JAVA class files located in a particular repository. If the name supplied as an argument is found in the repository, an array of bytes corresponding to the lambda object are retrieved using the loadFromCustomRepository function, which returns the array of bytes. The array of bytes is used to construct a new object of the appropriate type. If the name is not found in the repository, an exception can be thrown.

FIG. 14B illustrates an initLoader function that can be used to load repository contents from a given path (e.g., a specific file or network path).

Example 16

Example Class for Priority Functions

FIGS. 15A and 15B illustrates example code in the JAVA programming language for a priority function class, PFunction, which can represent a generic class of priority functions (e.g., functions to schedule process execution). The PFunction class includes data members for a unique name or identifier for the function and a name or identifier for an application associated with the function. The PFunction class can also include data members for dynamic evaluation functions and dynamic evaluation parameters associated with a given instance of the PFunction class.

The PFunction class can be associated with various frameworks or services, such as authentication service, an execution service, and a service to combine the results of dynamic function associated with an instance of the PFunction class.

A PFunction method can be used to add an instance of the PFunction class to a dynamic evaluation engine, and to initialize associated dynamic functions and dynamic parameters. An execute function can execute dynamic functions associated with an instance of the PFunction class, including computing any dynamic parameters and then using the dynamic parameters to execute one or more dynamic functions associated with the instance. That is, an instance of PFunction includes functionality to call a dynamic evaluation engine (e.g., the dynamic evaluation engine 312 of FIG. 3). The execute function can also execute any application evaluation functions, or retrieve or calculate any application evaluation parameters, which can be user-specified functions or parameters. The combiner can then appropriately combine the results of each of the evaluated dynamic functions, and optionally application evaluation functions.

With reference to FIG. 15B, the PFunction class can also include methods to set dynamic methods and dynamic parameters used by an instance of the PFunction class.

Example 17

Example Derived Priority Function Classes

FIGS. 16A and 16B illustrate example code in the JAVA programming language for specific implementations of a priority function class, MessagePriorityPFunction, which is derived from the PFunction class described with respect to FIGS. 15A and 15B.

The MessagePriorityFunction class includes various parameters that can be evaluated by dynamic evaluation functions associated with the class. For instance, the parameters can include a load on the node (e.g., a processing load), a time of day, a location of the node (or a computing cluster associated with the node), a concurrency factor (which can indicate a desired degree of parallelization), a size associated with a group into which nodes can be clustered, and a throttling or use factor to be associated with the group.

The MessagePriorityFunction class also include a number of functions that will be evaluated using the provided parameters. With reference to FIG. 16B, an example dynamic function to be evaluated, getSystemLoadFunction, is provided.

Note that while MesagePriorityPFunction is shown as a derived class, MessagePriorityPFunction could be implemented as an instance of the PFunction class. That is, the name, application identifier, dynamic evaluation functions, and dynamic evaluation parameters could be supplied to an instance of PFunction.

Example 18

Example Operations with Dynamic Evaluation Engine or Dynamic Evaluation Service Manager FIG. 17A illustrates a method 500 for processing an application method request for a prioritization value. The method 500 can be carried out, at least in a particular example, by the dynamic evaluation engine 312 of FIG. 3. At 502, a request is received, such as by a dynamic prioritization engine, to register the application method. The request can include an application method identifier. A request is sent to a remote computing system, at 506, for dynamic prioritization parameters, dynamic prioritization functions, or a combination thereof, for the application method identifier.

One or more dynamic prioritization parameters, dynamic prioritization functions, or a combination thereof, are received from the remote computing system at 510 to be associated with the application method identifier. At 514, the one or more dynamic prioritization parameters, dynamic prioritization functions, or combination thereof, are stored in association with the application method identifier.

A prioritization request is received from the application method at 518. The prioritization request comprises the application method identifier. The application method identifier is used at 522 to retrieve the one or more dynamic prioritization parameters, dynamic prioritization functions, or combination thereof, associated with the application method identifier. At 526, a prioritization value is determined based at least in part on the one or more dynamic prioritization parameters, dynamic prioritization function, or combination thereof, associated with the application method identifier. The prioritization value is returned to the application method in response to the request at 530.

FIG. 17B illustrates a method 534 for processing an application method request for an evaluation result. The method 534 can be carried out, at least in particular example, by the dynamic evaluation engine 312 of FIG. 3. At 538, a request is received to register the application method with a dynamic evaluation engine of the application. The request to register includes an application method identifier. A request is sent at 542 to a computing system for dynamic evaluation parameters, dynamic evaluation functions, or a combination thereof, for the application method identifier. One or more dynamic evaluation parameters, dynamic evaluation functions, or combination thereof, are received from the remote computing system at 546 to be associated with the application method identifier. The received one or more dynamic evaluation parameters, dynamic evaluation functions, or combination thereof, are stored in association with the application method identifier at 550.

At 554, an evaluation request is received from an application, and includes the application method identifier. Using the application method identifier, at 558, the one or more dynamic evaluation parameters, dynamic evaluation functions, or a combination thereof, associated with the application method identifier are retrieved. An evaluation result is determined at 562 based at least in part on the one or more dynamic evaluation parameters, dynamic evaluation functions, or a combination thereof, associated with the application method identifier. The evaluation result is used by the application method, at 566, to proceed with its execution.

Figure 17C:
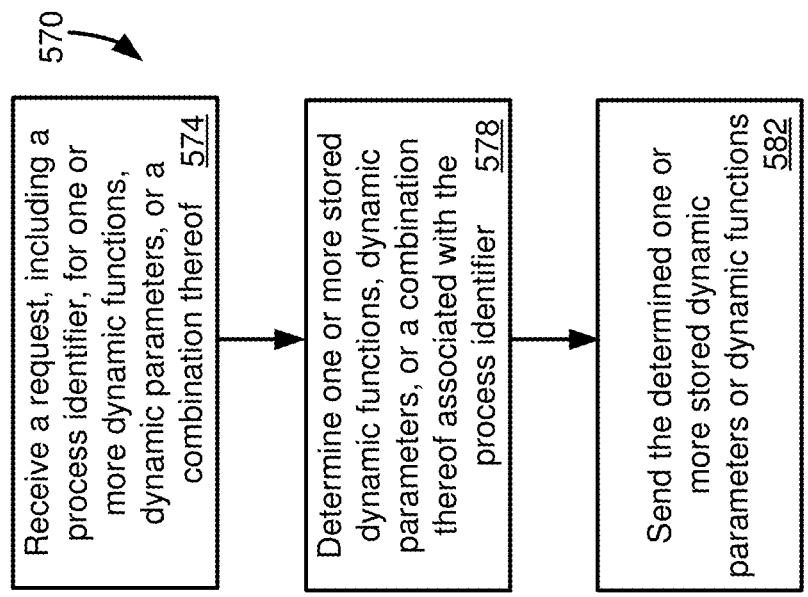
FIG. 17C is a flowchart of an example method of providing dynamic evaluation functions, dynamic evaluation parameters, or a combination thereof, in response to a request by a dynamic evaluation engine.

FIG. 17C illustrates a method 570 for sending one or more stored dynamic evaluation functions, one or more stored dynamic evaluation parameters, or a combination thereof, in response to a request by a dynamic evaluation engine. In a particular example, the method 570 can be carried out by the dynamic evaluation service manager 314 of FIG. 3, in response to a request by the update processor 348 of the dynamic evaluation engine 312.

At 574, a request is received that includes a process identifier. The request can include additional information, such as an application identifier or authentication information. One or more stored dynamic evaluation functions, one or more stored dynamic evaluation parameters, or a combination thereof, associated with the process identifier, are determined at 578. At 582, the one or more determined one or more stored dynamic evaluation parameters or dynamic evaluation functions are sent in response to the request.

Example 19

Example Computing Systems

Figure 18:
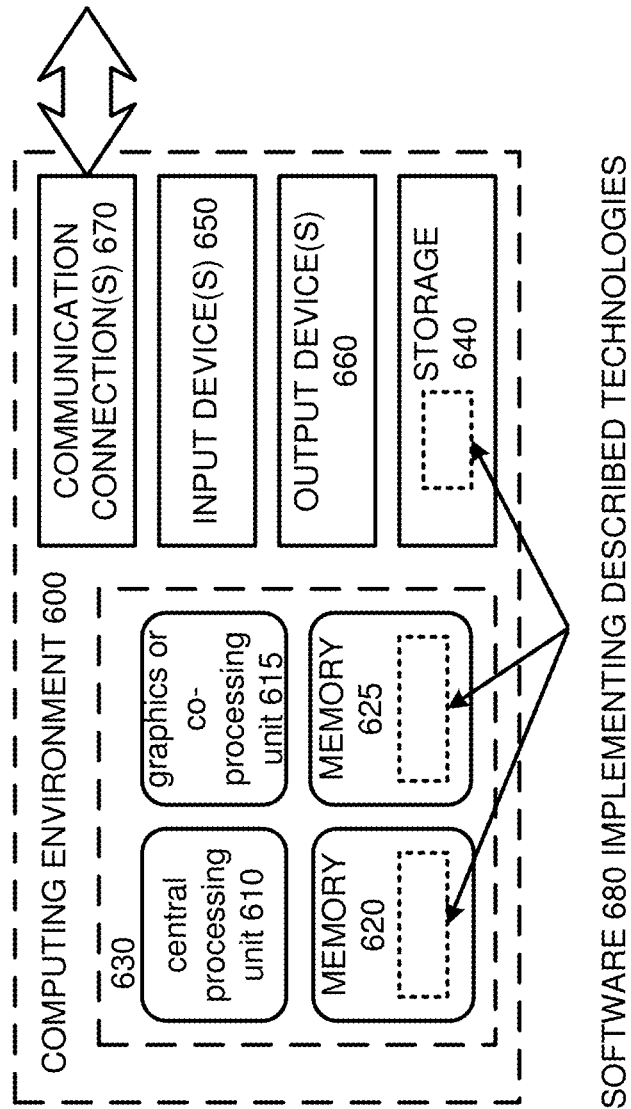
FIG. 18 is a diagram of an example computing system in which described embodiments can be implemented.

FIG. 18 illustrates a generalized example of a suitable computing system 600 in which several of the described innovations may be implemented. The computing system 600 is not intended to suggest any limitation as to scope of use or functionality, as the innovations may be implemented in diverse general-purpose or special-purpose computing systems.

With reference to FIG. 18, the computing system 600 includes one or more processing units 610, 615 and memory 620, 625. In FIG. 18, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 18 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s), such instructions for implementing a dynamic evaluation engine or a dynamic evaluation service manager.

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein. The storage 640 does not include signals per se.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 20

Example Cloud-Supported Environment

Figure 19:
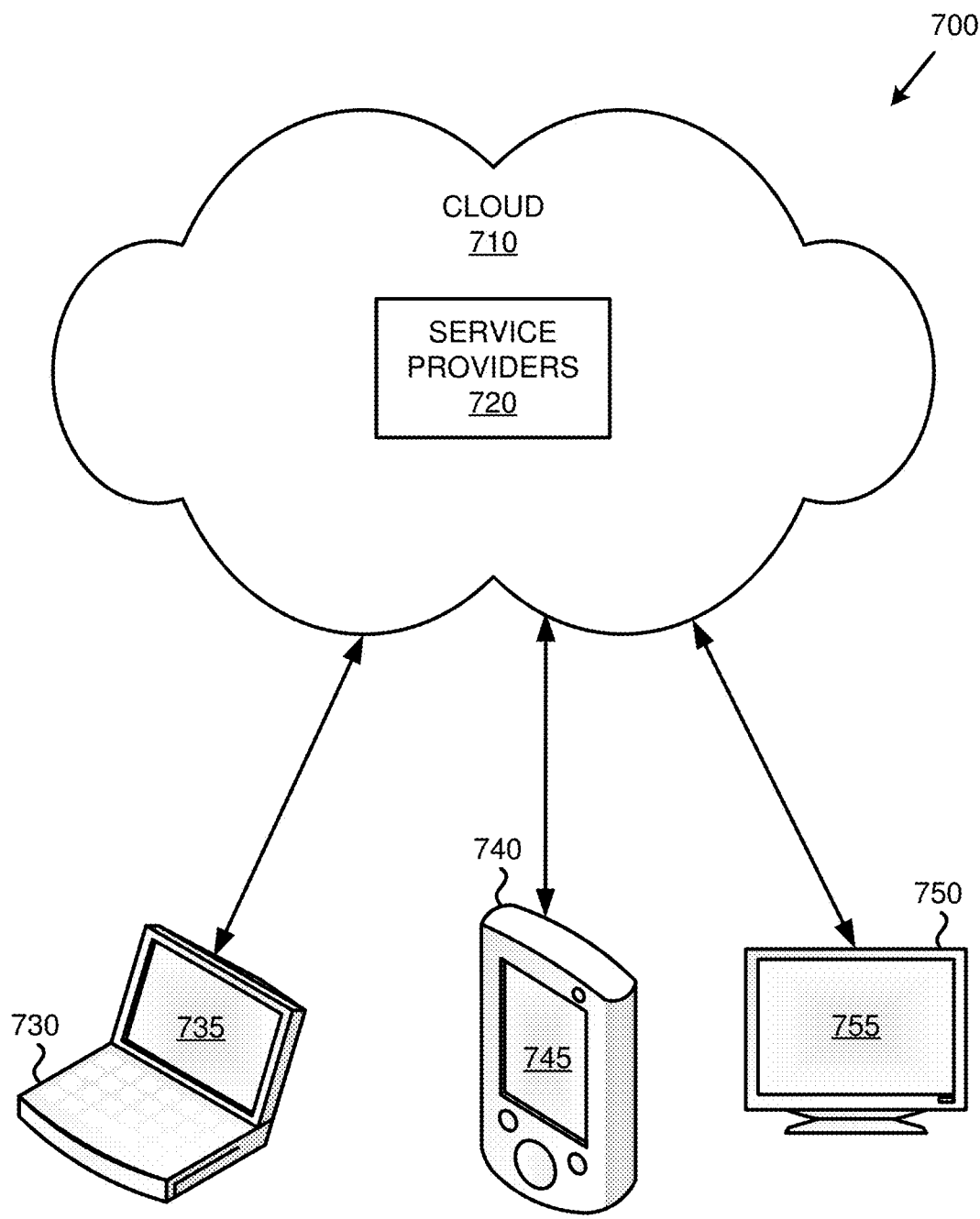
FIG. 19 is an example cloud-support environment that can be used in conjunction with the technologies described herein.

In example environment 700 of FIG. 19, the cloud 710 provides services for connected devices 730, 740, 750 with a variety of screen capabilities. Connected device 730 represents a device with a computer screen 735 (e.g., a mid-size screen). For example, connected device 730 could be a personal computer such as desktop computer, laptop, notebook, netbook, or the like. The connected device 740 represents a device with a mobile device screen 745 (e.g., a small size screen). For example, the connected device 740 could be a mobile phone, smart phone, personal digital assistant, tablet computer, and the like. The connected device 750 represents a device with a large screen 755. For example, the connected device 750 could be a television screen (e.g., a smart television) or another device connected to a television (e.g., a set-top box or gaming console) or the like. One or more of the connected devices 730, 740, 750 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 700. For example, the cloud 710 can provide services for one or more computers (e.g., server computers) without displays.

Services can be provided by the cloud 710 through service providers 720, or through other providers of online services (not depicted). For example, cloud services can be customized to the screen size, display capability, and/or touch screen capability of a particular connected device (e.g., connected devices 730, 740, 750).

In example environment 700, the cloud 710 provides the technologies and solutions described herein to the various connected devices 730, 740, 750 using, at least in part, the service providers 720. For example, the service providers 720 can provide a centralized solution for various cloud-based services. The service providers 720 can manage service subscriptions for users and/or devices (e.g., for the connected devices 730, 740, 750 and/or their respective users).

Example 21

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media).

Any of the computer-readable media herein can be non-transitory (e.g., volatile memory such as DRAM or SRAM, nonvolatile memory such as magnetic storage, optical storage, or the like) and/or tangible. By way of example, and with reference to FIG. 18, computer-readable storage media include memory 620 and 625, and storage 640. The term computer-readable storage media does not include signals and carrier waves. In addition, the term computer-readable storage media does not include communication connections (e.g., 670). Computer-readable media can be limited to implementations not consisting of a signal. None of the computer-readable media herein include signals per se.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Example 22

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. All that comes within the scope and spirit of the claims is therefore claimed as the invention.

What is claimed is:

1. One or more computer-readable storage media comprising computer-executable instructions that, when executed, cause a computing system to perform processing comprising:

receiving a request from a method of a locally-executing application, during application runtime, to register the application method with a dynamic prioritization engine of the application, the request comprising an identifier of the application method, the identifier of the application method identifying the method of the application;

sending a request from the dynamic prioritization engine of the application to a remote computing system for dynamic prioritization parameters, dynamic prioritization functions, or a combination thereof for the identifier of the application method;

receiving, by the dynamic prioritization engine of the application, one or more dynamic prioritization parameters, dynamic prioritization functions, or a combination thereof from the remote computing system to be associated with the identifier of the application method;

storing, by the dynamic prioritization engine of the application, the one or more dynamic prioritization parameters, dynamic prioritization functions, or combination thereof in association with the identifier of the application method;

receiving, by the dynamic prioritization engine of the application, a prioritization request from the application method, the prioritization request comprising the identifier of the application method;

by the dynamic prioritization engine of the application, using the identifier of the application method to retrieve the one or more dynamic prioritization parameters, dynamic prioritization functions, or combination thereof, associated with the identifier of the application method;

by the dynamic prioritization engine of the application, determining a prioritization value based at least in part on the one or more dynamic prioritization parameters, dynamic prioritization functions, or combination thereof, associated with the identifier of the application method; and returning the prioritization value from the dynamic prioritization engine of the application to the application method in response to the request.

2. The one or more computer-readable storage media of claim 1, the processing further comprising:

determining that at least one updated prioritization parameter is available for the identifier of the application method;

sending a request to a prioritization service of the remote computing system for the at least one updated prioritization parameter;

receiving the at least one updated prioritization parameter from the prioritization service; and storing the at least one updated prioritization parameter in association with the identifier of the application method.

3. The one or more computer-readable storage media of claim 1, the processing further comprising:

determining that an updated prioritization function is available for the identifier of the application method;

sending a request to a prioritization service of the remote computing system for the updated prioritization function;

receiving the updated prioritization function from the prioritization service; and storing the updated prioritization function in association with the identifier of the application method.

4. The one or more computer-readable storage media of claim 1, wherein determining a prioritization value comprises calculating the prioritization value based at least in part on the one or more dynamic prioritization parameters, dynamic prioritization functions, or combination thereof associated with the identifier of the application method.

5. The one or more computer-readable storage media of claim 1, wherein determining a prioritization value comprises retrieving a previously calculated prioritization value.

6. The one or more computer-readable storage media of claim 1, wherein prioritization parameters used in the determining comprise one or more static parameters.

7. The one or more computer-readable storage media of claim 6, wherein the prioritization parameters used in the determining further comprise one or more dynamic parameters.

8. The one or more computer-readable storage media of claim 1, wherein the prioritization parameters used in the determining comprise one or more dynamic parameters.

9. The one or more computer-readable storage media of claim 1, wherein the prioritization function is a first prioritization function and determining a prioritization value comprises:

determining at least a second prioritization function associated with the identifier of the application method and having prioritization parameters;

determining a first result of the first prioritization function and a second result of the second prioritization function; and combining the first and second results to provide the prioritization value.

10. A system comprising:

memory;

one or more hardware processors coupled to the memory;

one or more computer-readable media storing instructions that, when loaded into the memory, cause the one or more hardware processors to perform operations for, in the runtime of a locally-executing application being executed by the one or more hardware processors:

receiving a request from an application method of the application to register the application method with a dynamic evaluation engine of the application, the request comprising an identifier of the application method, the identifier identifying the method of the application;

sending a request from the dynamic prioritization engine of the application to a remote computing system for dynamic evaluation parameters, dynamic evaluation functions, or a combination thereof, for the identifier of the application method;

receiving by the dynamic prioritization engine of the application one or more dynamic evaluation parameters, dynamic evaluation functions, or a combination thereof, from the remote computing system to be associated with the identifier of the application method;

storing, by the dynamic prioritization engine of the application, the one or more dynamic evaluation parameters, dynamic evaluation functions, or combination thereof, in association with the identifier of the application method;

receiving by the dynamic prioritization engine of the application an evaluation request from an application, the evaluation request comprising the identifier of the application method;

by the dynamic prioritization engine of the application, using the identifier of the application method to retrieve the one or more dynamic evaluation parameters, dynamic evaluation functions, or a combination thereof, associated with the identifier of the application method;

by the dynamic prioritization engine of the application, determining an evaluation result based at least in part on the one or more dynamic evaluation parameters, dynamic evaluation functions, or a combination thereof, associated with the identifier of the application method; and using, by the application method, the evaluation result in application method execution.

11. The system of claim 10, wherein the received one or more dynamic evaluation parameters, dynamic evaluation functions, or a combination thereof comprise one or more JAVA class files.

12. The system of claim 11, wherein the sending occurs after the receiving of the evaluation request.

13. The system of claim 10, the operations further comprising:

determining that one or more updates to dynamic evaluation functions, dynamic evaluation parameters, or a combination thereof, are available for the identifier of the application method;

sending a request to the remote computing system for the one or more updates; and applying the one or more updates to dynamic evaluation functions, dynamic evaluation parameters, or a combination thereof associated with the identifier of the application method.

14. The system of claim 10, the operations further comprising:
determining that one or more dynamic evaluation functions, dynamic evaluation parameters, or a combination thereof associated with the identifier of the application method are not present in a cache;
sending a request to a repository for the one or more dynamic evaluation functions, dynamic evaluation parameters, or a combination thereof associated with the identifier of the application method that are not present in the cache;
receiving the one or more dynamic evaluation functions, dynamic evaluation parameters, or a combination thereof associated with the identifier of the application method that are not present in the cache; and
storing the one or more dynamic evaluation functions, dynamic evaluation parameters, or a combination thereof associated with the identifier of the application method that are not present in the cache.

15. The system of claim 10, the operations further comprising:
determining that cached data associated with a prior determination of the evaluation result is available; and
using the cached data at least in part to determine the evaluation result.

16. A method implemented at least in part by a computing system, the method comprising:
receiving a request from a method of a locally-executing application, during application runtime, to register the application method with a dynamic prioritization engine of the application, the request comprising an identifier of the application method, the identifier of the application method identifying the method of the application;
sending a request from the dynamic prioritization engine of the application to a remote computing system for dynamic prioritization parameters, dynamic prioritization functions, or a combination thereof for the identifier of the application method;
receiving, by the dynamic prioritization engine of the application, one or more dynamic prioritization parameters, dynamic prioritization functions, or a combination thereof from the remote computing system to be associated with the identifier of the application method;
storing, by the dynamic prioritization engine of the application, the one or more dynamic prioritization parameters, dynamic prioritization functions, or combination thereof in association with the identifier of the application method;
receiving, by the dynamic prioritization engine of the application, a prioritization request from the application method, the prioritization request comprising the identifier of the application method;
by the dynamic prioritization engine of the application, using the identifier of the application method to retrieve the one or more dynamic prioritization parameters, dynamic prioritization functions, or combination thereof, associated with the identifier of the application method;
by the dynamic prioritization engine of the application, determining a prioritization value based at least in part on the one or more dynamic prioritization parameters, dynamic prioritization functions, or combination thereof, associated with the identifier of the application method; and
returning the prioritization value from the dynamic prioritization engine of the application to the application method in response to the request.

17. The method of claim 16, further comprising:
determining that at least one updated prioritization parameter is available for the identifier of the application method;
sending a request to a prioritization service of the remote computing system for the at least one updated prioritization parameter;
receiving the at least one updated prioritization parameter from the prioritization service; and
storing the at least one updated prioritization parameter in association with the identifier of the application method.

18. The method of claim 16, further comprising:
determining that an updated prioritization function is available for the identifier of the application method;
sending a request to a prioritization service of the remote computing system for the updated prioritization function;
receiving the updated prioritization function from the prioritization service; and
storing the updated prioritization function in association with the identifier of the application method.

19. The method of claim 16, wherein determining a prioritization value comprises calculating the prioritization value based at least in part on the one or more dynamic prioritization parameters, dynamic prioritization functions, or combination thereof associated with the identifier of the application method.

20. The method of claim 16, wherein prioritization parameters used in the determining comprise one or more static parameters and one or more dynamic parameters.

* * * * *